United States Patent [19]
Nakayama

[11] Patent Number: 5,943,154
[45] Date of Patent: Aug. 24, 1999

[54] OPTICALLY-CONTROLLED LIGHT CONTROL ELEMENT

[75] Inventor: Toshio Nakayama, Fujisawa, Japan

[73] Assignee: Kabushiki Kaisha Toshiba, Kawasaki, Japan

[21] Appl. No.: 08/931,653

[22] Filed: Sep. 16, 1997

[30] Foreign Application Priority Data

Sep. 17, 1996 [JP] Japan .................................... 8-245060
Mar. 17, 1997 [JP] Japan .................................... 9-063280

[51] Int. Cl.$^6$ ................ G02B 1/04; G02F 1/01; G02F 1/17
[52] U.S. Cl. ...................... 359/244; 359/240; 359/255
[58] Field of Search .................... 359/244, 255, 359/243, 240, 237, 246; 385/1, 2, 131, 143

[56] References Cited

U.S. PATENT DOCUMENTS

| | | | |
|---|---|---|---|
| 4,733,369 | 3/1988 | Bogner ................................... | 365/119 |
| 4,871,236 | 10/1989 | Gemma et al. ......................... | 350/355 |
| 5,061,509 | 10/1991 | Naito et al. ............................ | 427/13 |
| 5,144,473 | 9/1992 | Gemma et al. ......................... | 359/270 |
| 5,155,566 | 10/1992 | Nakayama et al. .................... | 357/30 |
| 5,240,762 | 8/1993 | Miura et al. ............................ | 428/220 |
| 5,659,415 | 8/1997 | Staver et al. ........................... | 359/244 |

FOREIGN PATENT DOCUMENTS 6-130443  5/1994  Japan .................................... 359/244

OTHER PUBLICATIONS

C.W. Tang and S.A. VanSlyke, *Organic Electroluminescent Diodes*, Applied Physics Letters, vol. 51, No. 12, pp. 913–915, Sep. 21, 1987.

*Primary Examiner*—Georgia Epps
*Assistant Examiner*—Margaret Burke
*Attorney, Agent, or Firm*—Finnegan, Henderson, Farabow, Garrett & Dunner, L.L.P.

[57] ABSTRACT

A light control element comprising a light control layer containing an electron donating organic compound and an electron accepting organic compound and means for applying an external electric field having an intensity less than a value which is required to cause phase transition in the light control layer to the layer, wherein charge transfer excitons are produced in application of the external electric field.

9 Claims, 8 Drawing Sheets

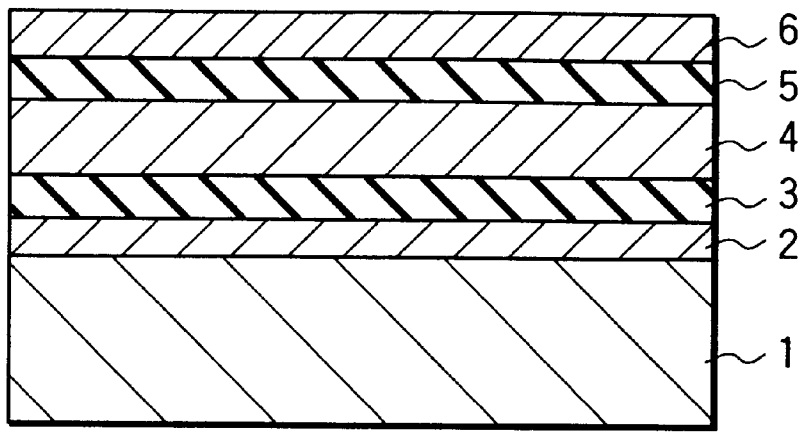

OPTICALLY-CONTROLLED LIGHT CONTROL ELEMENT

BACKGROUND OF THE INVENTION

The present invention relates to a light control element, an more particularly to an all-optical light control element from which an optical signal can be output under the control of light.

The present invention also relates to an organic thin-film element which can control signals with electricity or light, store information and transmit information.

An advanced information-oriented society will emerge in the twenty-first century. It will then be necessary to transmit and process super mass storage information at high speeds (e.g., terabits or more per second), with high precision and high efficiency. Even today such a tremendous amount of information can be transmitted through trunk lines and processed by the data-processing apparatus on the trunk lines. It is expected, however, that such super mass storage information will need to be transmitted and processed also on subscriber sides.

The data-processing speed of the electronic system widely used now is limited, about 50 gigabits per second at most. The system cannot transmit or process such super mass storage information. In view of this, an optical system capable of transmitting and processing information at much higher speeds than the electronic system now available will become desirable in the near future.

In the optical system, important is an light control element which performs modulation and demodulation at an ultra-high speed, i.e., an all-optical light-control element. The optical, light-control optical element has no limitation to a working band due to the CR product in an electronic circuit. It can effect an ultrahigh speed control of modulation and demodulation. The optical light-control element is advantageous in that its output light can be used as control light or signal light without any modifications.

In an optical system with optical light-control elements used as an optical gate element, an optical logic element, an optical bistable element, an optical pulse-controlled element and the like, information can be transmitted and processed at an ultrahigh speed, unlike in the electronic system. The optical system can be an optical computer which is free from low-speed transmission and processing of information inherent in the electronic system.

In such control of light signal using light, a nonlinear optical effect plays an important role.

Nonlinear optical effects of third order, i.e., changes in refractive index and absorption coefficient, depending on an optical intensity, draw attention as a fundamental principle in optical light-control element.

The refractive index n and the absorption coefficient α have the following relations with the light intensity I in the nonlinear optical effects of third order:

$$n = n_0 + n_2 \times I$$

$$\alpha = \alpha_0 + \alpha_2 \times I$$

wherein $n_0$, $n_2$, $\alpha_0$ and $\alpha_2$ are, respectively, a linear refractive index, a non-linear refractive index, a linear absorption coefficient and a non-linear absorption coefficient.

As is clear from the equations, $n_2$ and $\alpha$ must have a higher non-linearity in order to obtain a larger change in an optical characteristic with light of a low intensity. The non-linearity of the nonlinear refractive index or the non-linear absorption coefficient determines a non-linear susceptibilty of the third order $\chi^{(3)}$.

Investigations on material showing non-linear optical effects of third order have advanced in three material systems, a semiconductor ultra fine particulate system, a semiconductor superlattice system and an organic π electron system material.

If direct transition semiconductor is used as a semiconductor superlattice based material, it will have a large nonlinear optical response due to a band filling effect. When GaAs/AlAs is used as a direct semiconductor, a non-linear susceptibility of third order $\chi^{(3)}$ as high as $5 \times 10^{-2}$ esu in a MQW is obtainable.

A semiconductor superlattice based material can have such a extremely large susceptibility $\chi^{(3)}$. However, the response speed is low. This is because the response speed depends on the recombination life time of optically excited carriers, where is the life time of an excited carrier is on the order of nanosecond. Therefore, an attempt has been made to increase surface recombination speed in order to increase the response speed. It is still impossible to achieve a high-speed response, especially a repetitive response of high speed at p sec level.

A semiconductor material, composed of five particles may provide a response speed as high as tens of p sec, with an increase in a surface recombination speed, if the particles have diameters of 10 nm or less. However, as eperiments with doped glass $CdS_xSe$ and the like show, a nonlinear susceptibility of third order $\chi^{(3)}$ is on the order of $10^{-9}$ to $10^{-8}$ esu, and a higher nonlinear susceptibility of third order has not been obtained.

An organic π electron system material achieves a high response speed on the order of f sec, since a non-linearity response is caused by pure polarization of π electrons. However, even a polydiactylene based para-toluene sulfonic acid ester derivative, which has been recognized to have the highest susceptibility of third order, a non linear susceptibility $\chi^{(3)}$ of $8 \times 10^{-10}$ esu, which is still very small.

A light control element using π electron system material is known. Since nonlinearity derives from pure polarization of π electrons, many attempts have been made to increase a conjugated length of π electrons by using an unidimensional π conjugate based highpolymer such as polydiacetylene, transpolyacetylene or polyallylenevinylene, or a cyclic π conjugate compound such as phthalocyanine so that a three-dimensional nonlinear susceptibility of third order $\chi^{(3)}$ may be increased. However, such approaches can hardly attain a sharp increase in non-linearity.

Besides, a light control element using π electron system material has to be irradiated with extremely intense light to cause a desired optical change. This is inevitably because an organic π electron system material has such a low susceptibility of third order, as mentioned above. If the element is irradiated with high-intensity light, the material will have not only optical damages but also thermal damages and, will have a new thermal effect.

Under such circumstances, a light control element has been desired which has not only a high susceptibility of third order but also a high response speed.

Recently, molecular electronics attracts a growing attention. In this field of art, efforts are made to develop a device having a new function, unknown to a traditional device, taking advantage of physical properties peculiar to an organic crystal or an organic molecule. Active researches have been so far conducted on applications of an organic molecule to a nonlinear optical element of second order, an electric switching element, an injection-type light emitting element, a solar cell, an optical information recording medium and the like.

These researches are to improve a device in the terms of characteristics and production cost, by using an organic material having physical properties exploited in the device made of an inorganic material system. One example of physical phenomena inherent in an organic molecular system, which also draws attention, is charge transfer observed in a kind of organic complex crystal.

Among organic materials are a donor molecule which has a small ionization energy and is easy to become a cation by giving away electrons to another molecule, and an acceptor molecule which has an electron affinity and is easy to become an anion when receiving electrons from another molecule. As well known in the art, a compound called a charge transfer complex is formed between these two kinds of molecules. For example, a compound formed between perylene and tetracyanoquinodimethane (TCNQ) is composed of neutral compounds. On the other hand, a compound formed between tetramethylphenylenediamine (TMPD) and TCNQ is one in which individual compounds are respectively ionized positive and negative. It is also known that neutral-ionic transition is observed in a compound between tetrathiafulvarene (TTF) and chloranil with change in temperature or pressure (J. B. Torrance et al.: Phys. Rev. Lett., 46, 253 (1981)).

Such a charge transfer phenomenon of an organic molecule may be utilized as a working principle of an electric element and an optical element. In this case, it is important how to cause charge transfer by an electric field or light with good efficiency and good controllability. Recently, an interesting result has been reported in regard to electrical characteristics of charge transfer complexes (Yoshinori Tokura et al. preliminary reports for the 1988 autumn meeting held by the Japanese society of physics, 3a-S4-1, 3a-S4-2, 3a-S4-3 and others; Y. Tokura et al.: Physica, 143B, 527 (1986)). The reports disclose that a mixed stack complex crystal having an alternate laminar structure, in which donor molecules and acceptor molecules are stacked with molecular planes facing each other, exhibits a high anisotropy in dielectric constant, a dielectric constant of 100 to 1000 in the direction of stacking, and nonlinear electric conduction and switching characteristic observed under application of an electric field of the order of $10^3$ to $10^4$/cm. As one of the suspected reasons is that an ionic domain in a neutral crystal or a neutral domain in an ionic crystal, both thermally or electrically generated in the bulk, is dynamically moved under the influence of an electric field.

This phenomenon is related with the neural-ionic transition and is a very localized change. The whole crystal does not change macroscopically. In the current state of the art, a macroscopic neutral-ionic transition is not produced by application of an electric field or radiation of light.

The electric field must be aligned with the direction of a stacking axis of donor molecules and acceptor molecules in order to cause macroscopic neutral-ionic transition with an electric field. To provide a device in which characteristics of an organic molecule are utilized, it is necessary to control not only the thickness and structural homogeneity of the film but also the positions of individual molecules, the arrangement of adjoining molecules and the stacking orientation of molecules.

Recently a Langmuir-Blodgett (LB) method has been drawn attention as a method of fabricating an ultra thin film in which molecular orientation and configuration are controlled. This method is to fabricate super lattice films made of the same kind or different kinds of molecules, by stacking unimolecular films formed on a water surface one by one. However, a packing condition or uniformity in configuration of molecules in a film extended over a water surface is poor, and an unimolecular film structure is sometimes disturbed during stacking the film on a substrate. Accordingly, a related technology has not reached such a level as to fabricate a superlattice thin film in which molecules are controlled in orientation across the entire film or between adjoining stacked layers. To improve a film forming technique by a LB method, molecules suitable for the LB method and a should be designed, and method of synthesizing such molecules should be decrized.

On the other hand, a vacuum evaporation method has been studied as a technique which can be applied with ease to an organic molecule of almost all kinds without requiring a special molecular design. In the vacuum evaporation method, however, an evaporation source of molecules is gasified and gasified molecules then cohere. Therefore, the film structure and the molecular orientation in the film may vary in accordance with a balance among the supply speed of gasified molecules, the surface diffusion of a molecule adsorbed on the surface of a substrate and the crystallization speed, and also with an interaction between an adsorbed molecule and a substrate surface.

Studies on an organic film heretofore have been mainly directed to a process of growing a thin film on various substrates and to the orientation of molecules in the thin film of a long chain hydrocarbon based linear molecule or a planar molecule such as phthalocyanine. Used as substrates are an alkali halide single crystal and a metal single crystal for evaluation by observation with an electron microscope or an electron diffraction technique, quartz for an optical evaluation and an Si single crystal for an electrical evaluation. As conditions of evaporation, the influences of the temperature and evaporation speed have been investigated. Vincett et al. of the United States of America have reported that a uniform, continuous film can be formed by setting a substrate at a temperature value about one third of the boiling point of an evaporation material, expressed in absolute value, regardless of kinds of substrates. However, simple optimization of evaporation conditions is not enough to control molecular orientation in an organic thin film on any kind of substrate surface.

Studies have been conducted on the influence of a substrate on molecular orientation in an organic film vapor-deposited on the substrate.

(1) Karl of West Germany has reported that a thin vapor-deposited film of several molecular layers of perylene tetracarboxylicdianhydride formed on a clean Si single crystal surface has molecular planes oriented parallel to the surface of the substrate.

(2) Hara has reported that in his study on a phthalocyanine vapor-deposited film prepared by means of a molecular beam evaporation method, a uniform, continuous film are obtained with its molecular planes oriented in parallel with the surface of substrate in conditions of ultra high vacuum and an evaporation speed as low as of the order of 0.1 nm/min, while only a discontinuous film is formed in a high vacuum evaporation under ordinary conditions. In this study, as a substrate, $MoS_2$ of a layered compound has been used in light of the concept of van der Waal's epitaxy in order to avoid a lattice mismatch with an organic crystal.

(3) Harada et al. have reported that, in a vapor-deposited film of pentacene having several molecular layers formed on a graphite substrate, molecular planes are oriented in parallel with the surface of the substrate.

Though many studies have been done in a variety of aspects concerning thin film formation by means of a vacuum evaporation method, a standardized understanding has not yet been established about a film structure and control factors in molecular orientation.

The inventors hereof have carried out an intensive research on the above-mentioned issues, paying attention to an interaction between a substrate and a vapor-deposited molecule thereon. They have found that a uniform, continuous film can be formed, if conditions of vapor-deposition are properly adjusted by the use of a highly oriented graphite substrate. They assume that orientation effect on the highly oriented graphite substrate is based on a dispersion force between the substrate and $\pi$ electron system compound molecules.

On the basis of such an assumption, the inventors have tried to improve a method of forming a molecular orientation control layer on a substrate, by using a thin film having a skelton analogous to graphite, and a method of adjusting a polarizability of surface atoms on the substrate in consideration of a dispersion force dependent on an electronic polarizability.

However, it is actually difficult to form such a molecular orientation control layer on any kind of a substrate. There exists a great obstacle against a development of an organic thin film element using an oriented crystal thin film.

As described above, to optimize functions characteristic of an organic thin film, it is necessary to form a thin film structure in which the molecular orientation is controlled with respect to the surface of a substrate or in which a crystallographic axis orientation is controlled in the thin film.

In order to render a control on molecular orientation practical, however, is a technology is required which can prepare not only a flat outermost surface in a molecular scale regardless of original surface irregularity of the substrate but also a good outermost surface with high controllability on molecular orientation.

BRIEF SUMMARY OF THE INVENTION

It is, accordingly, a first object of the present invention to provide a light control element realizing a high nonlinear susceptibility of third order and a high response speed at the same time.

It is a second object of the present invention to provide an organic thin film element, a structure and molecular orientation of which can be controllable regardless of a essential material properties and a shape of a substrate, and which is practically used as an optical element and electronic element.

It is a third object of the present invention to provide a method of manufacturing an organic thin film element, a structure and molecular orientation of which can be controllable regardless of material properties and shape of a substrate, and which is practically used as an optical element and electronic element.

A first aspect of the present invention is directed to a light control element comprising:

a substrate;

a first electrode layer formed on the substrate;

a first insulator layer formed on the first electrode layer;

a light control layer containing an electron donating organic compound and an electron accepting organic compound on the first insulator layer;

a second insulator layer formed on the light control layer;

a second electrode layer formed on the second insulator layer; and means for applying an external electric field with an intensity less than a necessary value to cause a phase transition in the light control layer,
wherein charge-transfer excitons are generated by application of the external electric field with an intensity less than the necessary value.

A second aspect of the present invention is directed to an organic thin film element having a layered structure comprising:

a support layer;

a molecular orientation control layer made of an amorphous organic film formed on the support layer;

a crystalline organic thin film made of $\pi$ electron based molecules disposed on the molecular orientation control layer,
wherein the crystalline organic thin film is formed at a growth speed of 100 Å/min or less by means of a vacuum evaporation method and a thickness of the film is between a value of an unimolecular layer and 2000 Å.

A third aspect of the present invention is directed to an organic thin film element having a layered structure comprising an insulating film, a molecular orientation control film made of an amorphous organic thin film, a gate electrode and a crystalline organic thin film made of $\pi$ electron based molecules on a channel region between source and drain regions of a semiconductor substrate, wherein the crystalline organic thin film is formed at a growth speed of 100 Å/min or less by means of a vacuum evaporation method and a thickness of the film is in the range of a value an unimolecular layer to 2000 Å.

A fourth aspect of the present invention is directed to a method of fabrication an organic thin film element comprising:

forming an amorphous organic film on the surface of a support layer to obtain a molecular orientation control layer; and forming a crystalline organic thin film having a thickness between a thickness in the range of a value of a unimolecular layer and 2000 Å on the amorphous organic film at a growth speed of 100 Å/min or less by a vacuum evaporation method.

According to the first aspect of the present invention, bath of a high nonlinear susceptibility of third order and a high response speed can be realized in a light control element under application of an electric field to a light control layer with an intensity less than a necessary value to cause a phase transition in the light control layer. Moreover, with such improved characteristics, not only a light modulating element such as an ultra-high speed optical switching element, an optical logic element and the like can be realized, but also an optical logic element having a two-dimensional parallel processing function and an optical computer with the help of a further advance in miniaturization in an element design can be practically fabricated.

According to the second to fourth aspects of the present invention, a structure of an organic thin film and a molecular orientation thereof can be controlled regardless a shape and properties of material of a substrate and, thereby, an organic thin film element usable as an optical element or an electronic element in a practical sense can be obtained.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a sectional view of an embodiment of a light control element of the present invention;

FIG. 2 is a graph showing a relationship between neutral-ionic transition of a crystal and application of an electric field;

DETAILED DESCRIPTION OF THE INVENTION

Figure 3:
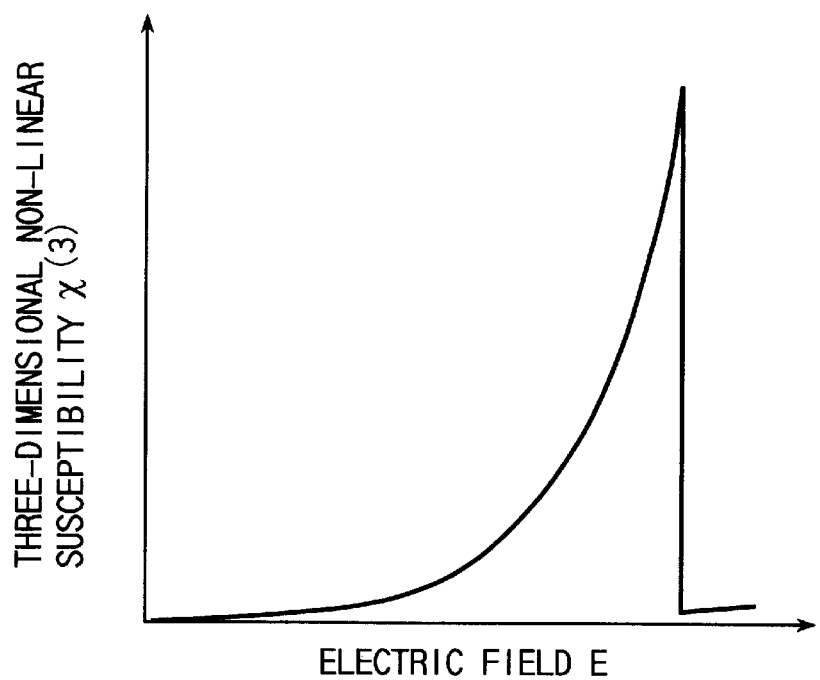
FIG. 3 is a graph showing a relationship between the electric field intensity and the non-linear susceptibility of third order $\chi^{(3)}$.

First of all, a light control element of the present invention will be explained.

A light control element of the present invention basically comprises: a substrate; a first electrode layer formed on the substrate; a first insulator layer formed on the first electrode layer; a light control layer containing an electron donating organic compound and an electron accepting organic compound; a second insulator layer formed on the light control layer; a second electrode layer formed on the second insulator layer; and means for applying an external electric field with an intensity less than a necessary value to cause a phase transition in the light control layer. In the light control element, charge-transfer excitons are generated by application of the external electric field with an intensity less than a necessary value to cause a phase transition in the light control layer.

An intensity of the external electric field is preferably an intensity less than a first value necessary to cause a phase transition in a light control layer and more than a second value of $1/10^4$ of the necessary value, or equal to the second value.

Signal light is input to a light control layer.

The signal light is controllable in the light control layer by application of an external electric field having an intensity less than a value necessary to cause a phase transition in the light control layer, but control light is, preferably, radiated to the light control layer in order to control an output intensity of the signal light by means for radiating control light.

The light control layer includes an electron-donating organic compound and an electron-accepting organic compound and essentially consists of a mixed-stack charge-transfer complex crystal in which the electron-donating organic compound and the electron-accepting organic compound are alternately stacked in a substantial sense. When a mixed-stack charge-transfer complex crystal is used, a neutral-ionic transition occurs in application of a predetermined electric field.

It is preferable that at least one of the first and the second insulators has optical transparency. When one of the insulators has optical transparency, the signal light can be guided through the transparent insulator to the light control layer as incident light.

The signal light can be radiated to the light control layer in a direction parallel to the surface of a substrate.

In a light control element of the present invention, a molecular orientation control layer can be provided at least one of positions between the first insulator layer and the light control element, and between the second insulator layer and the light control layer. With the use of a molecular orientation control layer, a feature of high crystallinity of an organic thin film can be effectively utilized and an organic thin film element, which uses anisotropy in physical properties in regard to directions of crystallographic axes, can be obtained.

A molecular orientation control layer is preferably made of an amorphous organic film and, more preferably, made of an organic film containing molecules with a steroid-based skelton.

Moreover, a molecular orientation control layer preferably has a structure stacked with different kinds of amorphous organic films and, more preferably, includes at least one amorphous organic film containing molecules with a steroid-based skelton.

A light control element of the present invention will be below described in reference to the accompanying drawings:

In FIG. 1, a sectional view of a light control element according to an embodiment of the present invention is shown.

In this figure, a reference mark 1 indicates a substrate and on one major surface of the substrate 1, the following layers are in succession stacked in the order: a first electrode layer 2; a first insulator layer 3; a light control layer 4; a second insulator 5; and a second electrode layer 6. In such a stack structure, the electrode layers 2, 6, the insulator layers 3, 5 and the light control layer 4 are arranged in mutual parallel with respect to their major faces.

As a substrate used in a light control element of the present invention, a transparent substrate such as a transparent dielectric made of glass, quartz, oxides and the like can be named. A substrate which does not have optical transmissivity such as semiconductor including Si, metal including Al and the like can be alternatives. These substrate are selected according to an activating method of the light control element.

The first and second electrode layers of the present invention can be transparent electrodes made of a material such as ITO, ZnO, $SnO_2$ or the like, or a metal electrode made of a material such as Al, Au, Ag, Pt or the like. Besides, as a material of the electrode film, a conductive high polymer film made of a material such as polypirol, polyaniline and polythiophene can be used. These electrodes can be selected according to an activating method of the light control element and the first and second electrode layers can be both made of transparent electrodes or metal electrodes, or a mixed combination of one transparent electrode and the other metal electrode. A metal electrode plate can be used as a substrate described above, but, generally, a metal electrode is formed as a thin film with a thickness in the range of 20 Å to 2000 Å on an insulator substrate.

The first and second electrode layers of a light control element of the present invention may have respectively optical reflectivity on opposed major faces. The major faces of these electrode layers are arranged in parallel to each other so as to form mirrors in a Fabry-Perot resonator.

The first and second insulator layers used in a light control element of the present invention can be made of an insulating organic compound such as succinonitrile, polymethylmethacrylate (PMMA), polyimide, polystyrene or poysilane, or a metal oxide insulator such as $SrTiO_3$ or $SiO_2$, or an organic film containing molecules with a steroid-based skelton.

The insulator layer preferably have a function as a molecular orientation control layer. The molecular orientation control layer can be used for controlling molecular orientating properties.

Insulator layers are preferably made of a material with a high dielectric constant such that a voltage may effectively applied to a light control layer. As such an insulator, ferroelectric can be named, but a material with a dielectric constant of 10 or more such as $SrTiO_3$ or $PbTiO_3$ is preferably used.

In a light control element of the present invention, signal light is guided in a light control layer sandwiched between a pair of insulator layers and control light is radiated to the light control layer to control output light. Here, the signal light is light whose output is controlled by a light control element of the present invention. A wavelength of the signal light is in the range of 300 nm to 2000 nm and an intensity of that is in the range of 0.01 $MW/cm^2$ to 100 $MW/cm^2$. On the other hand the control light is light to control optical properties of the light control layer and a wavelength of the control light is in the range of 300 nm to 2000 nm and an intensity of that is in the range of 0.01 $MW/cm^2$ to 1 $GW/cm^2$. Theses signal and control light may be radiated to the light control layer separately or the signal light itself may be used as the control light.

When signal light is directly guided to a light control layer and output from the light control layer in a direction in parallel to one major surface of a substrate without transmission through an insulator layer, it is unnecessary for the insulator to have optical transmissivity. However, when signal light is guided through an insulator layer and then guided to a light control layer, or an output light from the light control layer is guided through an insulator to be output outward, the insulators have to have an optical transmissivity. Optical transmissivity of such insulators are generally controlled so that a reflectance of these insulators may be adjusted 50% or less.

As a light control layer of a light control element of the present invention, a mixed-stack charge-transfer complex crystal which is formed by stacking alternately an electron donating organic compound which is a donor molecule and an electron accepting organic compound which is an acceptor molecule can be used.

The followings are abbreviations, names of compounds or chemical formulae of donor molecules and acceptor molecules used in a light control layer:

Donor molecules

Aniline [D-1]

N-methylaniline [D-2]

N,N-dimethylaniline [D-3]

PD: p-phenylenediamine [D-4]

ClPD: 2-chloro-p-phenylenediamine [D-5]

ClMePD: 2-chloro-5-methyl-p-phenylenediamine [D-6]

DClPD: 2,5-dichloro-p-phenylenediamine [D-7]

DMePD: 2,5-dimethyl-p-phenylenediamine [D-8]

DAD: diamino durene [D-9]

TMPD: N,N,N',N',-tetramethyl-PD [D-10]

N,N-DMePD: N,N-dimethyl-PD [D-11]

1,5-dimethylnaphthalene [D-12]

1,8-dimethylnaphthalene [D-13]

benzidine [D-14]

TMB: 3,3',5,5'-tetramethy-benzidine [D-15]

N N N' N'-TMB: N,N,N',N'-tetramethylbenzidine [D-16]

DAP: 1,6-diaminopyrene [D-17]

TMDAP: N,N,N',N'-tetramethyl-DAP [D-18]

phenazine [D-19]

$M_2P$: 5,10-dimethyl-5,10-dehydrophenazine [D-20]

$E_2P$: 5,10-diethyl-5,10-dehydrophenazine [D-21]

$Pr_2P$: 5,10-dipropyl-5,10-dehydrophenazine [D-22]

HMP: 5-methyl-5,10-dihydrophenazine [D-23]

$M_6P$: 5, 10-dihydro-2,3,5,7,8,10-hexamethylphenazine [D-24]

PTZ: phenothiazine [D-25]

N-MePTZ: N-methylphenothiazine [D-26]

ClPTZ: 2-chlorophenothiazine [D-27]

TDAE: tetrakis (dimethylamino) ethylene ferrocene [D-28]

dimetylferrocene [D-29]

decamethylferrocene [D-30]

nicekelocene decamethylnickelocene cobaltocene

TTF: tetrathiafulvalene [D-31]

DMTTF: 2,6-dimethyltetrathiafulvalene [D-32]
TMTTF: tetramethyltetrathiafulvalene [D-33]
DPhTTF: 2,6-diphenyltetrathiafulvalene [D-34]
DPhDMTTF: 2,6-diphenyl-3,7-dimethyltetrathiafulvalene [D-35]
DBTTF: dibenzotetrathiafulvalene [D-36]
OMTTF: octamethylenetetrathiafulvalene [D-37]
HMTTF: hexamethylenetetrathiafulvalene [D-38]
$TTC_1TTF$ [D-39]
$TTeC_1TTF$ [D-40]
TSF: tetraselenafulvalene [D-41]
TMTSF: tetramethyltetraselenafulvalene [D-42]
HMTSF: hexamethylenetetraselenafulvalene [D-43]
HMTTeF: hexamethylenetetratellafulvalene [D-44]
TTT: tetrathiatetracene [D-45]
TST: tetraselenatetracene [D-46]
BTP: tetraphenylbithiopyralidene [D-47]
naphthalene
anthracene
phenanthrene
pentacene
pyrene
penylene
azulene
acenaphthene
carbazole
acridine
Acceptor molecules
BQ: p-benzoquinone [A-1]
$R^1R^2R^3R^4BQ$ ($R^1$-$R^4$=H, Me, Cl, Br, I, F, CN) [A-2]
$R^1BQ$: ($R^1$=Me, Cl, Br) [A-3]
   MeBQ
   ClBQ
   BrBQ
$R^1R^2BQ$: 2-$R^1$-5-$R^2$-BQ ($R^1$, $R^2$=Me, Cl, Br) [A-4]
   $Me_2BQ$
   $Cl_2BQ$
   ClMeBQ
   $Br_2BQ$
   BrMeBQ
2-$R^1$-6-$R^2$-BQ ($R^1$, $R^2$=Me, Cl, Br) [A-5]
   2,6-$Cl_2BQ$
   2,6-$Br_2BQ$
   2,6-$Me_2BQ$
$Cl_3BQ$: 2,3,5-trichloro-p-benzonquinone [A-6]
CA: chloranyl [A-7]
BA: bromanyl [A-8]
IA: iodanyl [A-9]
FA: fluoranyl [A-10]
DDQ: 2,3-dicyano-5,6-dichloro-p-benzoquinone [A-11]
$Me_4BQ$: tetramethyl-p-benzoquinone [A-12]
o-BQ: o-benzoquinone [A-13]
o-CA: o-chloranyl [A-14]
o-BA: o-bromanyl [A-15]
NQ: naphthoquinone [A-16]
$R^1R^2R^3R^4R^5R^6NQ$ [A-17]
$R^1R^2NQ$=2-$R^1$-3-$R^2$-NQ ($R^1$, $R^2$=Cl, CN) [A-18]
   $Cl_2NQ$: 2,3-dichloronaphthoquinone
   $(CN)_2NQ$: 2,3-dicyanonaphthoquinone AQ: 9,10-anthraquinone [A-19]
$R^1R^2R^3R^4R^5R^6AQ$ [A-20]
TCNQ: tetracyanoquinodimethane [A-21]
$R^1R^2R^3R^4TCNQ$ [A-22]
$R^1TCNQ$: 2-$R^1$-TCNQ ($R^1$=Me, OMe, F, Cl, Br) [A-23]
   MeTCNQ
   (OMe)TCNQ
   FTCNQ
   ClTCNQ
   BrTCNQ
$R^1R^2TCNQ$: 2-$R^1$-5-$R^2$-TCNQ ($R^1$, $R^2$=Me, Et, Pr, OMe, F, Cl, Br, I) [A-24]
   $Me_2TCNQ$
   $Et_2TCNQ$
   $Pr_2TCNQ$
   $(OMe)_2TCNQ$
   $F_2TCNQ$
   $Cl_2TCNQ$
   $Br_2TCNQ$
   $I_2TCNQ$
   ClMeTCNQ
   BrMeTCNQ
   IMeTCNQ
$F_4TCNQ$ [A-25]
TCNNQ: tetracyano-1,4-naphthoquinodimethane [A-26]
$R^1R^2R^3R^4R^5R^6$ TCNNQ [A-27]
TCNAQ: tetracyano-9,10-anthraquinodimethane [A-28]
$R^1R^2R^3R^4R^5TCNAQ$ [A-29]
TNAP: tetracyano-2,6-naphthoquinodimethane [A-30]
$F_6TNAP$ [A-31]
TCNDQ [A-32]
$F_8TCNDQ$ [A-33]
DCNQI: dicyanoquinonediimine [A-34]
$R^1R^2R^3R^4DCNQI$ [A-35]
$R^1DCNQI$: 2-$R^1$-dicyanoquinonediimine ($R^1$=Me, Cl, Br) [A-36]
   MeDCNQI: 2-methyldicyanoquinonediimine
   ClDCNQI: 2-chlorodicyanoquinonediimine
   BrDCNQI: 2-bromoldicyanoquinonediimine
$R^1R^2DCNQI$: 2-$R^1$-5-$R^2$-DCNQI ($R^1$, $R^2$=Me, Cl, Br) [A-37]
   DMeDCNQI: 2,5-dimethyldicyanoquinonediimine
   ClMeDCNQI: 2-chloro-5-methyldicyanoquinonediimine
   DClDCNQI: 2,5-dichlorodicyanoquinonediimine
   BrMeDCNQI 2-bromo-5-methyldicyanoquinonediimine
   $Br_2DCNQI$: 2-dibromodicyanoquinonediimne
   $Cl_4DCNQI$: 2,3,5,6-tetrachlorodicyanoquinonediimine
   $F_4DCNQI$: 2,3,5,6-tetrafluorodicyanoquinonediimine
DCNNQI: dicyano-1,4-naphthoquinonediimine [A-38]
$R^1R^2R^3R^4R^5R^6DCNNQI$ [A-39]
DCNAQI: dicyano-1,4-naphthoquinonediimine [A-40]
$R^1R^2R^3R^4R^5R^6DCNAQI$ [A-41]
TNB: 1,3,5-trinitrobenzene [A-42]
TNF: 2,4,7-trinitro-9-fluorenone [A-43]
DTF: 2,4,7-trinitro-9-fluorenylidenemalonitrile [A-44]
TENF: 2,4,5,7-tetranitro-9-fluorenone [A-45]
DTENF: 2,4,5,7-tetranitro-9-fluorenylidenemalononitrile [A-46]
TCNE: tetracyanoethylene [A-47]
HCBD: hexacyanobutadiene [A-48]

HCNB: hexacyanobenzene [A-49]
TCNB: tetracyanobenzene [A-50]
DCNB: dicyanobenzene [A-51]
PMDA: pyromelliticdianhydride [A-52]
[D-1]
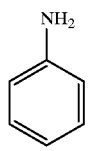
[D-2]
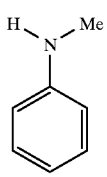
[D-3]
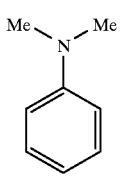
[D-4]
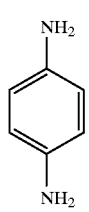
[D-5]
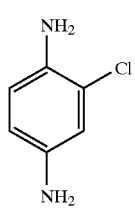
[D-6]
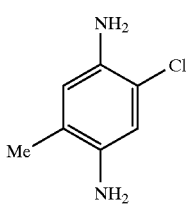
[D-7]
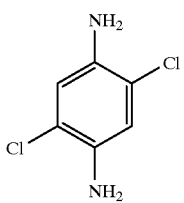
-continued
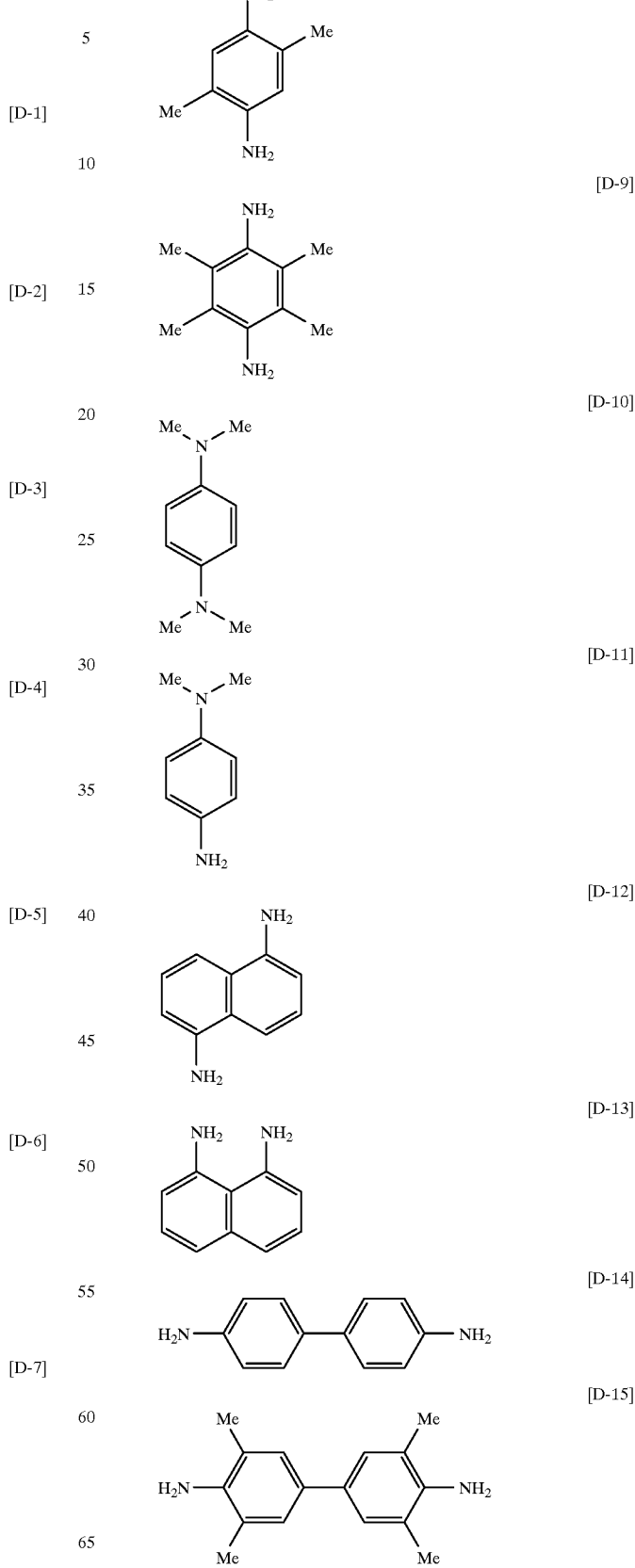

-continued

[D-16]

[D-17]

[D-18]

[D-19]

[D-20]

[D-21]

[D-22]

[D-23]

[D-24]

[D-25]

[D-26]

[D-27]

[D-28]

[D-29]

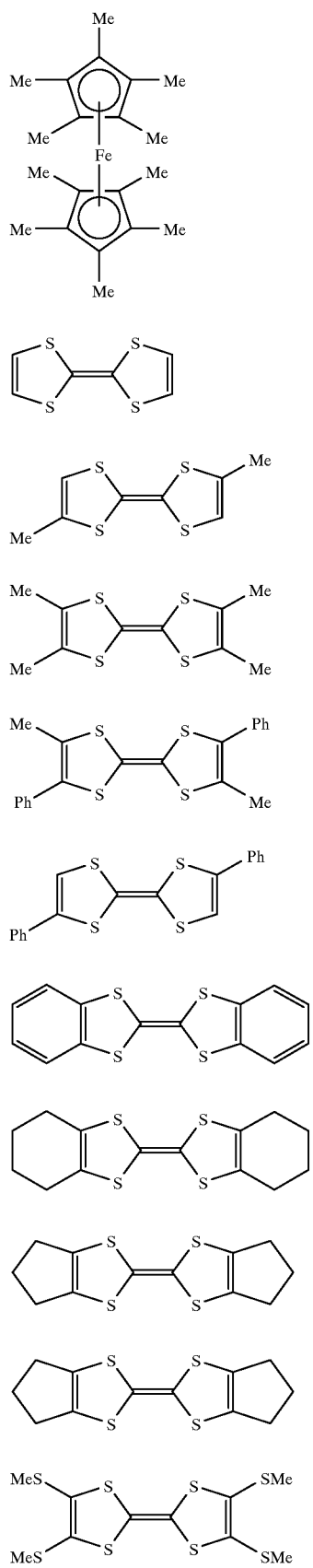
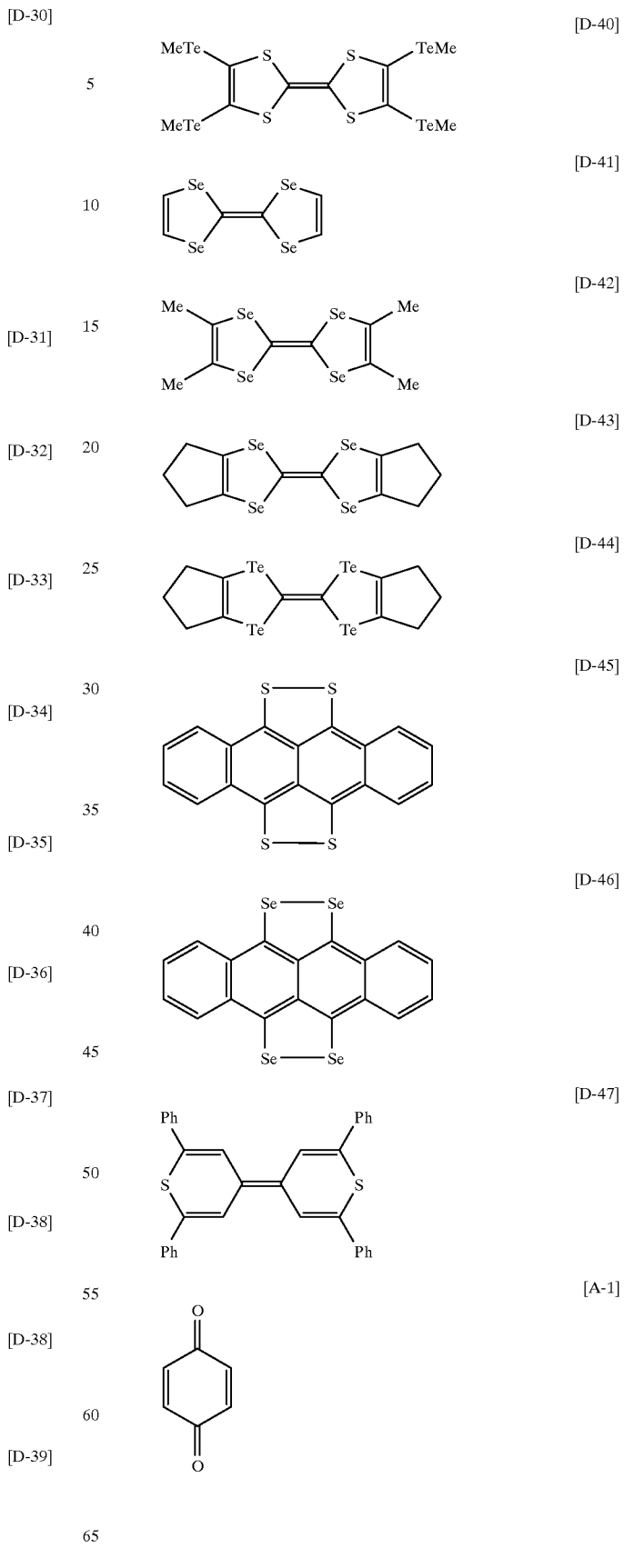

-continued
[A-2]
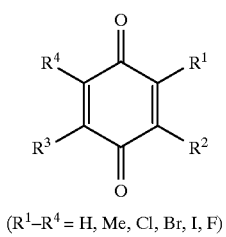
($R^1$–$R^4$ = H, Me, Cl, Br, I, F)
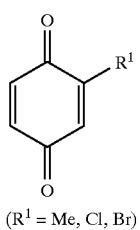
($R^1$ = Me, Cl, Br)
[A-3]
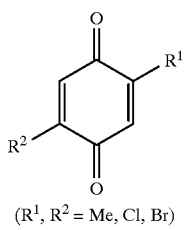
($R^1$, $R^2$ = Me, Cl, Br)
[A-4]
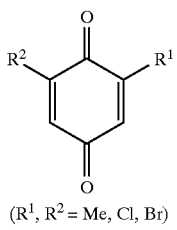
($R^1$, $R^2$ = Me, Cl, Br)
[A-5]
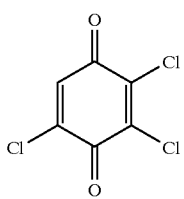
[A-6]
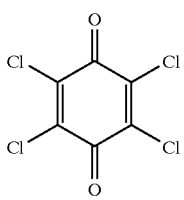
[A-7]
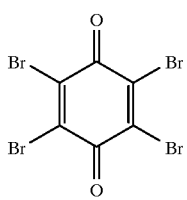
-continued
[A-9]
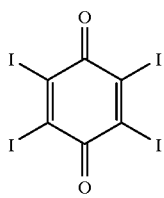
[A-10]
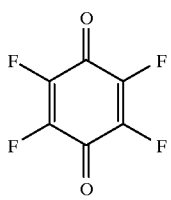
[A-11]
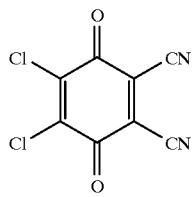
[A-12]
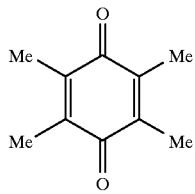
[A-13]
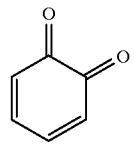
[A-14]
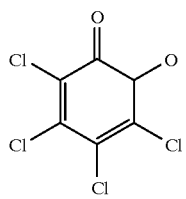
[A-15]
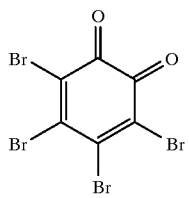

-continued
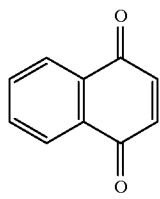
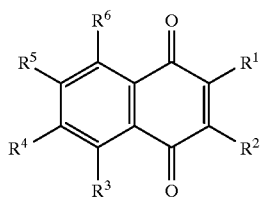
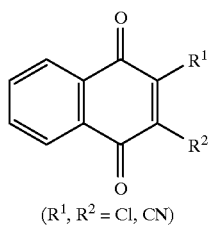
($R^1$, $R^2$ = Cl, CN)
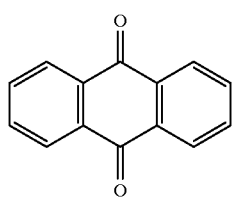
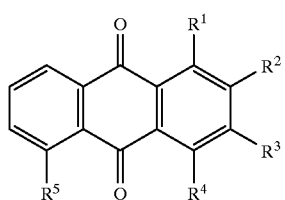
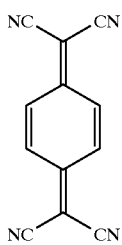
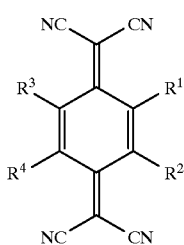
[A-16]
[A-17]
[A-18]
[A-19]
[A-20]
[A-21]
[A-22]
-continued
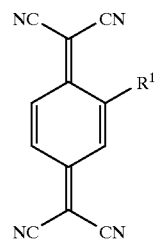
($R^1$ = Me, OMe, F, Cl, Br)
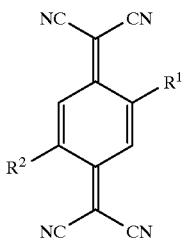
($R^1$, $R^2$ = Me, Et, Pr, OMe, F, Cl, Br, I)
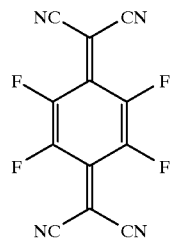
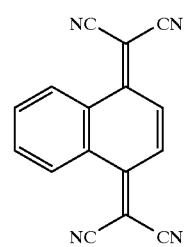
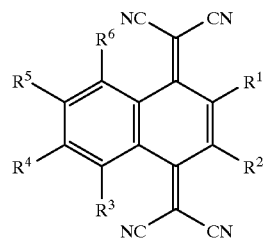
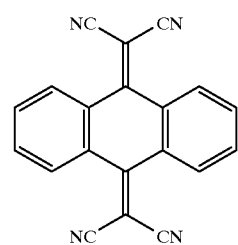
[A-23]
[A-24]
[A-25]
[A-26]
[A-27]
[A-28]

-continued
[A-29] 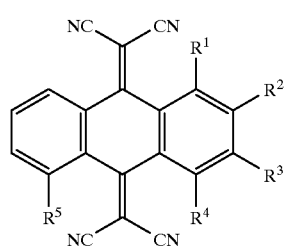
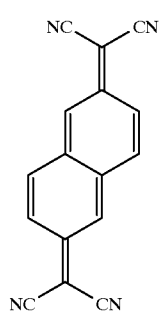
[A-30] 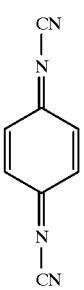
[A-31] 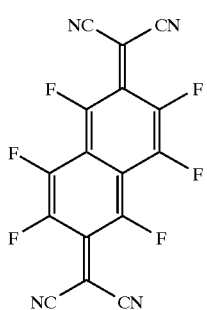
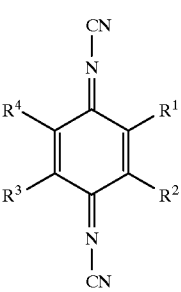
[A-32] 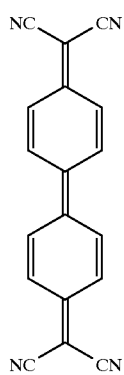
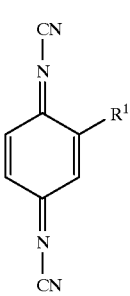
($R^1$ = Me, Cl, Br)
[A-33] 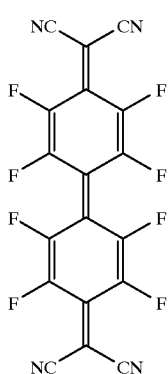
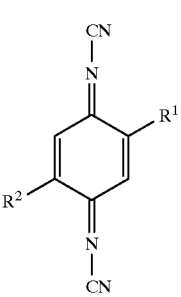
($R^1$, $R^2$ = Me, Cl, Br)
[A-34]
[A-35]
[A-36]
[A-37]
[A-38] 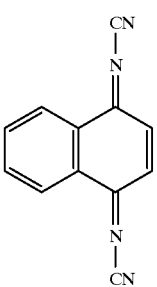

-continued
[A-39] 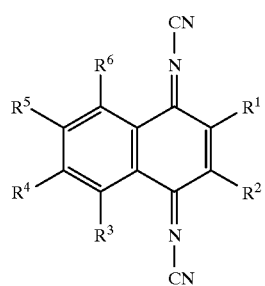
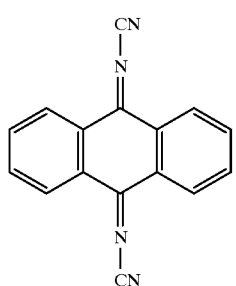
[A-40] 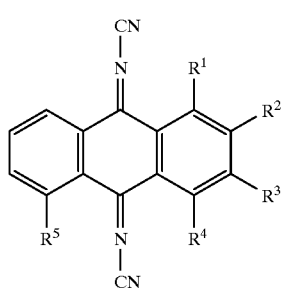
[A-41] 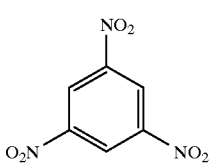
[A-42] 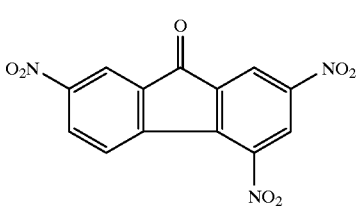
[A-43] 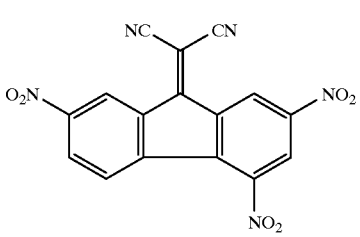
[A-44]
-continued
[A-45] 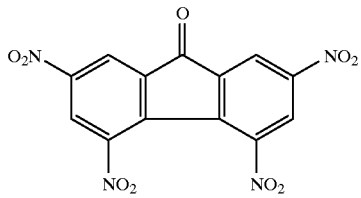
[A-46] 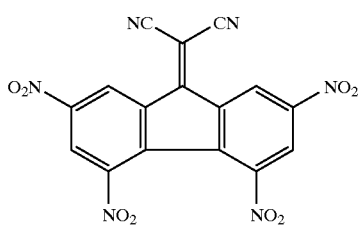
[A-47] 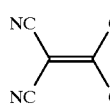
[A-48] 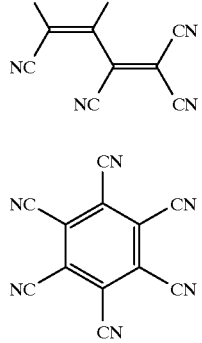
[A-49]
[A-50] 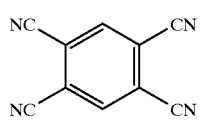
[A-51] 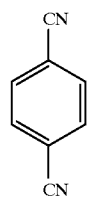
[A-52]
In the following tables, combinations of donor molecules and acceptor molecules are shown.

TABLE 1

| Doner | Acceptor |
|---|---|
| | TCNQ |
| PD | R¹TCNQ |
| ClMePD | (R¹ = Me, F, Cl, Br) |
| DMePD | R¹R²TCNQ |
| N,N-DMePD | (R¹, R² = Me, F, Cl, Br, I) |
| TMPD | F₄TCNQ |
| DAD | TNAP |
| | TCNDQ |
| | F₂TCNQ |
| | Cl₂TCNQ |
| DClPD | Br₂TCNQ |
| | I₂TCNQ |
| | F₄TCNQ |
| | FA |
| PD | CA |
| DMePD | BA |
| N,N-DMePD | IA |
| TMPD | DDQ |
| DAD | (CN)₂NQ |
| ClMePD | DDQ |
| DClPD | |

TABLE 2

| Doner | Acceptor |
|---|---|
| | DCNQI |
| | R¹DCNQI |
| PD | (R¹ = Me, Cl, Br) |
| DMePD | R¹R²DCNQI |
| N,N-DMPD | (R¹, R² = Me, Cl, Br) |
| TMPD | Cl₄DCNQI |
| DAD | F₄DCNQI |
| | DTF |
| | DTENF |
| | DCNQI |
| | R¹DCNQI |
| | (R¹ = Me, Cl, Br) |
| | ClMeDCNQI |
| ClMePD | BrMeDCNQI |
| | DClDCNQI |
| | Br₂DCNQI |
| | Cl₄DCNQI |
| | F₄DCNQI |
| | DClDCNQI |
| | Br₂DCNQI |
| DClPD | Cl₄DCNQI |
| | F₄DCNQI |

TABLE 3

| Doner | Acceptor |
|---|---|
| | FTCNQ |
| | F₂TCNQ |
| | F₄TCNQ |
| | ClMeTCNQ |
| | Cl₂TCNQ |
| | BrMeTCNQ |
| | Br₂TCNQ |
| TMB | IMeTCNQ |
| DAP | I₂TCNQ |
| TMDAP | F₄DCNQI |
| | ClMeDCNQI |
| | DClDCNQI |
| | CL₄DCNQI |
| | BrMeDCNQI |
| | Br₂DCNQI |
| | DDQ |

TABLE 4

| Doner | Acceptor |
|---|---|
| | TCNQ |
| | R¹TCNQ |
| | (R¹ = Me, F, Cl, Br) |
| | R¹R²TCNQ |
| | (R¹, R² = Me, F, Cl, Br, I) |
| | F₄TCNQ |
| | DCNQI |
| | R¹DCNQI |
| | (R¹ = Me, Cl, Br) |
| M₂P | R¹R²DCNQI |
| E₂P | (R¹, R² = Me, Cl, Br) |
| Pr₂P | Cl₄DCNQI |
| HMP | F₄DCNQI |
| M₆P | FA |
| | CA |
| | BA |
| | IA |
| | DDQ |
| | DTF |
| | DTENF |
| | TNAP |
| | TCNDQ |

TABLE 5

| Doner | Acceptor |
|---|---|
| PTZ | |
| N-MePTZ | DDQ |
| ClPTZ | |
| | BA |
| | DDQ |
| | R¹R²DCNQI |
| TTF | (R¹ = Me, Cl, Br |
| | R² = Cl, Br) |
| | Cl₄DCNQI |
| | F₄DCNQI |
| | DDQ |
| | R¹R²DCNQI |
| DMTTF | (R¹ = Me, Cl, Br |
| | R² = Cl, Br) |
| | Cl₄DCNQI |
| | F₄DCNQI |

TABLE 6

| Doner | Acceptor |
|---|---|
| | FTCNQ |
| | F₂TCNQ |
| | F₄TCNQ |
| | ClMeTCNQ |
| | Cl₂TCNQ |
| | BrMeTCNQ |
| DBTTF | Br₂TCNQ |
| OMTTF | IMeTCNQ |
| | I₂TCNQ |
| | TNAP |
| | DClDCNQI |
| | Br₂DCNQI |
| | Cl₄DCNQI |
| | F₄DCNQI |
| | TCNQ |
| TTeC₁TTF | R¹R²R³R⁴TCNQ |
| | (R¹ – R⁴ = H, Cl, Br, I, F) |
| ferrocene | DDQ |
| | TCNQ |
| | CA |
| cobaltocene | DDQ |
| | TNB |

TABLE 7

| Doner | Acceptor |
|---|---|
| | Cl₃BQ |
| | Cl₂BQ |
| | ClMeBQ |
| | Br₂BQ |
| | BrMeBQ |
| TMPD | ClBQ |
| N,N-DMePD | BrBQ |
| PD | Me₄BQ |
| DMePD | Me₂BQ |
| DAD | Cl₂BQ |
| | TNF |
| | TENF |
| | TCNB |
| | DCNB |
| | TNB |

TABLE 8

| Doner | Acceptor |
|---|---|
| | FA |
| | CA |
| | BA |
| | IA |
| | Cl₃BQ |
| ClMePD | Cl₂BQ |
| DClPD | ClMeBQ |
| ClPD | Br₂BQ |
| TMB | BrMeBQ |
| NNN'N'-TMB | ClBQ |
| DAP | BrBQ |
| TMDAP | Me₄BQ |
| benzidine | Me₂BQ |
| | TNF |
| | TENF |
| | TCNB |
| | DCNB |
| | TNB |

TABLE 9

| Doner | Acceptor |
|---|---|
| | Cl₃BQ |
| | Cl₂BQ |
| | ClMeBQ |
| | Br₂BQ |
| | BrMeBQ |
| M₂P | ClBQ |
| E₂P | BrBQ |
| Pr₂P | Me₂BQ |
| HMP | Me₄BQ |
| | TNF |
| | TENF |
| | TCNB |
| | DCNB |
| | TNB |
| | TCNQ |
| | MeTCNQ |
| | Me₂TCNQ |
| PTZ | R¹R²R³R⁴BQ |
| N-MePTZ | (R¹ – R⁴ = Me, Cl, Br, I, F) |
| ClPTZ | TCNE |
| phenazine | TNF |
| | TENF |
| | TCNB |
| | DCNB |
| | TNB |

TABLE 10

| Doner | Acceptor |
|---|---|
| | TCNQ |
| | MeTCNQ |
| | Me₂TCNQ |
| | (OMe)TCNQ |
| benzidine | Et₂TCNQ |
| TMB | Pr₂TCNQ |
| NNN'N'-TMB | (OMe)₂TCNQ |
| | DMeDCNQI |
| | R¹R²R³R⁴BQ |
| | (R¹ – R⁴ = H, Me, Cl, Br, I, F) |
| | DMeDCNQI |
| | R¹BQ |
| | (R¹ = Me, Cl, Br)/ |
| | R¹R²BQ |
| TTF | (R¹, R² = Me, Cl, Br) |
| | IA |
| | FA |
| | Me₄BQ |
| | R¹R²R³R⁴BQ |
| DMTTF | (R¹ = R⁴ = H, Me, Cl, Br, I, F) |
| DPhTFF | DMeDCNQI |
| DPhTTF | TCNQ |

TABLE 11

| Doner | Acceptor |
|---|---|
| | TCNQ |
| | MeTCNQ |
| | Me₂TCNQ |
| DBTTF | DMeTCNQI |
| OMTTF | R¹R²R³R⁴BQ |
| | (R¹ – R⁴ = H, Me, Cl, Br, I, F) |
| | TCNQ |
| | R¹R²R³R⁴BQ |
| ferrocene | (R¹ – R⁴ = H, Me, Cl, Br, I, F) |
| | TCNB |
| | R¹R²R³R⁴TCNQ |
| | R¹R²R³R⁴BQ |
| naphthlene | R¹R²R³R⁴DCNQI |
| anthracene | R¹R²R³R⁴R⁵R⁶TCNNQ |
| phenanthrene | R¹R²R³R⁴R⁵R⁶NQ |
| pentacene | R¹R²R³R⁴R⁵R⁶DCNNQI |
| pyrene | R¹R²R³R⁴R⁵TCNAQ |
| penylene | R¹R²R³R⁴R⁵AQ |
| azulene | R¹R²R³R⁴R⁵DCNAQI |
| acenaphthene | TCNB |
| carbazole | DCNB |
| acridine | PMDA |
| | TNB |

Crystals composed of donor molecules and acceptor molecules exemplified in the above tables include charge transfer complexes in a neutral state and in an ionic state under no application of an external electric field, wherein a charge transfer complex in a neutral state is less in charge transfer between molecules but a charge transfer complex in an ionic state is more in charge transfer between molecules. In general, a degree of charge transfer in a mixed-stack charge-transfer complex is determined by an ionization energy of constituent molecules and a Madelung energy in an ionic crystal.

The inventors of the present invention have found that the ionization energy can be controlled by formation of a mixed crystal between crystals different in degree of charge transfer and, in addition, have disclosed in the published unexamined Japanese Patent Application No. H4-137666 (1992) that a Madelung energy can be controlled by processing a crystal to an ultra thin film and thereby changing the number of molecules contributing to the energy.

Therefore, the crystals shown in the tables, which are formed from combinations of donor molecules and acceptor molecules, can be used for a light control element of the present invention, even if they are combinations to form ionic charge transfer complexes under no application of an external electric field.

A thickness of a light control layer, which is formed as described above, can be varied according to kinds of material making an element and, in general, the thickness is in the range of 10 Å to 1 μm. Pairs of donor molecules and acceptor molecules are stacked along the direction of thickness of the light control layer in a stacked layer structure on the order of several to several thousand molecular layers in total.

A light control element of the present invention can be formed by successively stacking the following layers on a substrate in the written order: a first electrode layer, a first insulator layer, a light control layer, a second insulator layer and a second electrode layer. The electrode and insulator layers can be formed by means of a plurality of methods such as a vacuum evaporation method, a sputtering method, a plasma polymerization method, a CVD method and a spin-coating method and a light control layer can be also formed by means of various methods such as a vacuum evaporation method, a solution deposition method and a LB method.

The operating principle in a light control element of the present invention will be explained below:

Among organic compounds, there are donor molecules (D) which has a small ionization energy and become cations while donating electrons to another molecule and acceptor molecules (A) which has a large electron affinity and become anions while accepting electrons from another molecule. In a crystal which is formed in such a manner that these two kinds of molecules are properly selected, mixed and stacked, it is well known that compounds called a charge transfer complex is created, said charge transfer complex being stabilized by resonance between a non-bonding state and a state in which a bond is formed between a donor molecule and an acceptor molecule by electron transfer from the former to the latter, that is, a charge transferred state.

For example, a crystal which is formed between perylene and tetracyanoquinodimethane (TCNQ) by stacking, is a charge transfer complex wherein each compound has a high degree of a non-bonding state, or in other words is in a neutral state. In a crystal which is formed between tetramethylphenylenediamine (TMPD) and TCNQ, transfer of electrons from TMPD to TCNQ occurs and each molecule is shifted to a resonance state in which each has a higher share of a charge transferred state, that is, to an ionic state to form an ionic charge transfer complex.

It is well known that, in a crystal, the above mentioned degree of charge transfer is affected according to a change in an intensity of an external electric field. J. B. Torrance et al. has reported in an article in Phys. Rev. Lett., 46, 253 (1981) that a crystal formed by stacking tetrathiafulvalene (TTF) and chloranil (CA) produces transition between neutral and ionic phases (NI transition) by changes in their temperature or a pressure applied to them.

There has been a report that such NI transition has a possibility to occur under an external field other than temperature or pressure; for example, Y. Tokura et al, has reported in Physica, 143B, 527 (1986) that an electric conductivity of a neutral complex changes in a non-linear manner in application of an electric field of the order $10^3$ to $10^4$ V/cm. Moreover, S. Koshihara et al. has reported in Phys. Rev., B42, 6853 (1990) that an ionic domain or a neutral domain can be injected to a neutral or an ionic complex in a high excitation condition caused by photoirradiation on a neutral or ionic complex.

However, changes in state under applications of an electric field or photoirradiation above mentioned, are not macroscopic changes but microscopic ones. That is, these changes in state are only that an exciton like a $D^+A^-$ pair is locally produced in such a conversion of a one dimensional DA chain from DADADADADA . . . to DADAD$^+$A$^-$DADA . . . .

When a macroscopic or near-macroscopic change is produced in a high excitation by photoirradiation, that is, a photoinduced transition is produced, radiation of a very high intensity light is required. Therefore, in a practical sense, when incident light in a light control element is simply controlled by radiation or non-radiation of light to obtain controlled output light, there come problems that deterioration in crystal or another thermal effects unfavorably arises, since a high intensity light is radiated.

Very recently, it has been experimentally confirmed that, in the above mentioned microscopic change in a state under photoirradiation, a bound state in which charge transfer excitons such as a plurality (n) of $D^+A^-$ pairs are cohered is present. For example, in a anthracene- pyromelliticdianhydride (PMDA) crystal, when two or three charge transfer excitons come in a close vicinity of each other in a stack chain of donor and acceptor molecules, a bound state can come into existence by an electrostatic interaction between the charge transfer excitons which respectively have electric dipole.

Such a cohesive state of excitons is called as an exciton n-string state and, in a photoresponse, an optical nonlinearity is tremendously increased by a giant oscillator effect. Moreover, in a condition in which such a giant oscillator effect occurs, a life time of an exciton is shortened to an extreme extent and, thereby, a very high response speed can be obtained.

A change in a state of a crystal under the above mentioned application of an electric field is conceived to occur in a highly cohesive state of charge transfer excitons and it is assumed that the NI transition occurs because ground states are reversed between a neutral state and an ionic state, when a density of cohesion of the excitons is increased, as illustrated below in reference to a figure.

The NI transition in a crystal in application of an electric field will be explained in reference to FIG. 2:

As shown in the figure, when a field intensity E is 0, a donor molecule and an acceptor molecule both are in a neutral state. When a field intensity E is increased, however, excitons $D^+A^-$ are produced and cohere to provide a local ionic state. As a field intensity is further increased and an ionic state $D^+A^-$ is more stabilized than a neutral state DA, that is, when a field intensity E reaches a value $E_C$ which is necessary to cause a phase transition, all pairs of DA are changed to pairs of $D^+A^-$ and the NI transition is thus generated.

In FIG. 3, a relationship between the electric field intensity and the nonlinear susceptibility of third order $\chi^{(3)}$ in NI transition is shown in a graph. As shown in the graph, the nonlinear susceptibility of third order $\chi^{(3)}$ reaches the maximum thereof just before the field intensity E passes $E_C$.

Therefore, crystal of a light control layer is not degraded by radiation of a high intensity light and a high nonlinear susceptibility of third order and a high response speed can be obtained by employing such conditions that the light control layer is made of a crystal constituted from donor molecules and acceptor molecules and optical properties of the light control layer is controlled by radiation of light under constant application of a electric field having an intensity less than a value necessary for the light control layer to reach $E_C$.

In this case, as the electric field intensity is more increased, the non-linear susceptibility of third order is larger and, thereby, an intensity of control light can be lowered. An electric field intensity is preferably in the range of $E_c \times 10^{-4} \leq E < E_C$, or more preferably $0.1\ E_C \leq E < E_C$, However, with an electric field E beyond $E_C$, the neutral-ionic transition occurs and a charge transfer exciton effect cannot be utilized any more, since an ionic ground state prevails.

Figure 4:
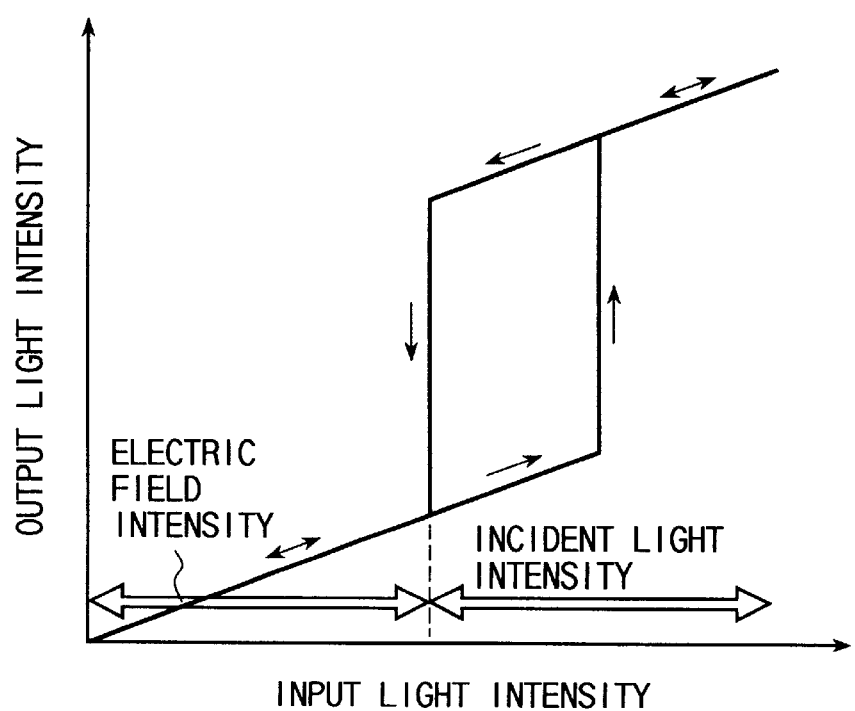
FIG. 4 is a graph showing a relationship between the input light intensity and the output light intensity in an optical bistable element of the present invention.

In FIG. 4, a relationship between the input light intensity and the output light intensity under application of a predetermined electric field in a light control element of a optical bistable type according to an embodiment of the present invention is shown in a graph.

As shown in the figure, a light control element which can assume two stable states in refractive index and absorption coefficient in a light control layer for input light with an intensity is called an optical bistable element and it is used as many kinds of optical modulators such as a memory element, an optical pulse shaping/limiter element, a differntiating amplifier element, a phototransistor, a logic element and the like.

Control of output of signal light in a light control element of the present invention is performed under conditions of application of a voltage and photoirradiation to a light control layer. The inventors and S. Tanaka et al. have made it clear through a simulation in an article appeared in Phys. Rev., B52, 1549 (1995) that application of a strong electric field equal to or more than $10^6$ V/cm is necessary to bring a crystal which is already in a state in a very close vicinity of a NI transition boundary to a state just before the transition occurs.

In order to effect a shift in states in a light control layer, it is preferred that a stacking direction of molecules is adjusted so that the direction of stacking of donor molecules and acceptor molecules in a crystal coincides with a direction of the electric field and thus a voltage is efficiently applied to the stacks of the molecules. For example, such a condition is realized if a molecular orientation control layer used for controlling growth orientation of molecules in the light control layer is positioned to a space between an insulator layer disposed on the side of a substrate and the light control layer.

As described above, optical characteristics in a light control layer of a light control element of the present invention are controlled by radiation of control light under application of a predetermined voltage but the optical characteristics of the light control layer can be controlled with changes in the voltage only. In this case, the control of the optical characteristics of the light control layer can be effected by a trace of change in the voltage.

Figure 5:
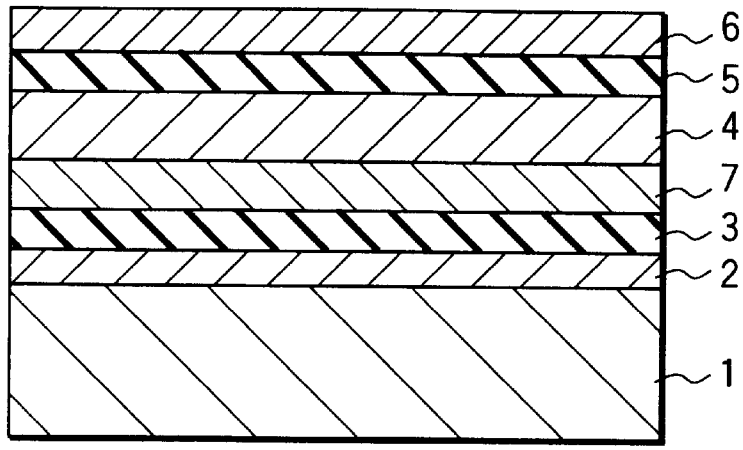
FIG. 5 is a sectional view of another embodiment of a light control element of the present invention.

In FIG. 5, a sectional view of another embodiment of a light control element of the present invention is shown.

A light control element shown in FIG. 5 has almost the same structure as that of the light control element shown in FIG. 1, but the light control element of FIG. 5 is different from that of FIG. 1 in regard to a point that a molecular orientation control layer 7 is disposed between an insulator layer 3 and a light control layer 4. A major surface of the molecular orientation control layer is preferably planar on a molecular scale in order to uniformalize stacking directions of donor molecules and acceptor molecules. Moreover, in order to control the stacking directions, the molecular orientation layer is preferably formed with using a material which causes a strong intermolecular interaction with the above molecules. As such a molecular orientation control layer, an organic amorphous film, a laminar compound having a structure analogous to that of graphite or the like can be named.

When such a molecular orientation layer is disposed, a stacking direction of donor molecules and acceptor molecules in the light control layer can be controlled in conformity with a direction perpendicular to a major surface of a substrate and, thereby, an electric field can be effectively applied to the crystal.

Characteristics of a molecular orientation control layer used in embodiments of the present invention will be further described below:

A light control layer which is responsible for functions of an element of the present invention can have a feature that it has a crystalline structure and besides even a ultra thin film made of a unimolecular layer is included in the category of a light control layer. Under such a circumstance, a characteristic which is required most fundamentally is that a molecular orientation control layer has no structure and a major surface is planar on a molecular scale.

For example, a π electron system molecule has a planar shape and the molecule has an inclination to have a higher stabilization energy in a manner that as many atoms composing a molecule as possible approaches as close to the substrate as possible, that is, by effecting parallel orientation, when the molecule receives a strong interaction from a substrate. Accordingly, if considered in the most simplified manner, in order to obtain a two dimensional crystal of an unimolecular layer made of molecules oriented in parallel, it is understood to be indispensable that the surface of a substrate for formation of an organic thin film which works as a light control layer is planar on a molecular scale. Such a condition is held true in the case where a thickness of the organic thin layer is larger. Therefore, in order to form a crystalline thin film in which molecular orientation is controlled on a substrate having any kind of surface structure, it is an effective means to dispose a molecular orientation control layer which realizes a planar structure on a molecular scale between an organic thin film and a substrate.

It is at least known from studies on an organic EL element that a surface structure of an organic amorphous film is a planar structure and such an organic amorphous film is very effective for fabrication of an element in practical use, since an organic film can be stacked on any kind of substrate.

However, it is necessary for a molecular orientation control layer not simply to have a planar surface structure but also to have a characteristic of surface-molecular interaction, which makes it possible to control molecular orientation at the surface of the molecular orientation control layer. That is, the molecular orientation control layer is required not only to have an amorphous structure but also a chemical character that the uppermost surface thereof which is in direct contact with a crystalline organic thin film has a capacity for control molecular orientation in the crystalline thin film. This is a unique point of the present invention which is different from a conventional organic thin film stacking technique on an organic amorphous film.

When a parallel orientation thin film having π electron system molecules of a planar shape is formed in parallel orientation with a molecular orientation control layer, it is necessary to control the outermost surface of an amorphous molecular orientation control film so as to produce a strong interaction between molecules to form a thin film and the molecular orientation control layer, as described above. On the other hand, when planar molecules are used to form a thin film whose molecular planes are perpendicular to the surface of a substrate, it is necessary to control the outermost surface of an amorphous molecular orientation control layer so that an intermolecular cohesive force may be larger compared with the interaction between a substrate and molecules.

As means for strengthen the interaction, effective are methods that atoms or atomic groups with a high electron polarizability are arranged in the vicinity of the surface of an amorphous organic film as much as possible so as to produce a large induced dipole for the purpose to strengthen a dispersion force, that aromatic rings and polycyclic aromatic groups are arranged on the surface and that a conductivity is given to the surface.

To the contrary, as means for weaken the interaction, effective is a method that atoms or atomic groups with a low electron polaizability are arranged in the vicinity of the surface of an amorphous organic film as much as possible so as not to produce a large induced dipole. It is effective to incorporate any of induction groups composed of atoms with low electron polarizability such as a methyl group, a carboxyl group, a ketone group, an alcoholic group, an amino group and a fluorine containing group into the outermost crust of an amorphous molecule in order not to bring polycyclic aromatic group to the outermost surface.

As an amorphous organic film used in embodiments of the present invention, any of films made of a material of a lower molecular weight and a high polymer can be chosen. As a material used for a lower molecular weight amorphous organic film, any of amorphous organic molecules such as Alq3, OXD, OXD-S, diamine, BNIBPC, TDAB, TPTTA, TDP, TTPAE, TDATA, DPH, PPCP and TCTA can be named.

The above mentioned amorphous organic molecules have such structural formulae as shown below:

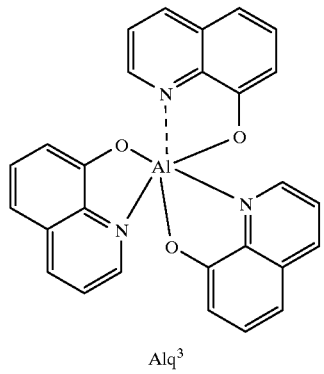

Alq$^3$

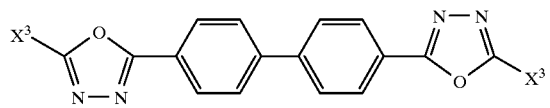

X$_3$—

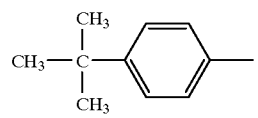

OXD-1

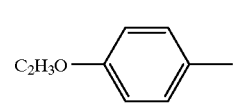

OXD-2

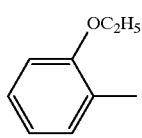

OXD-3

OXD-4

-continued
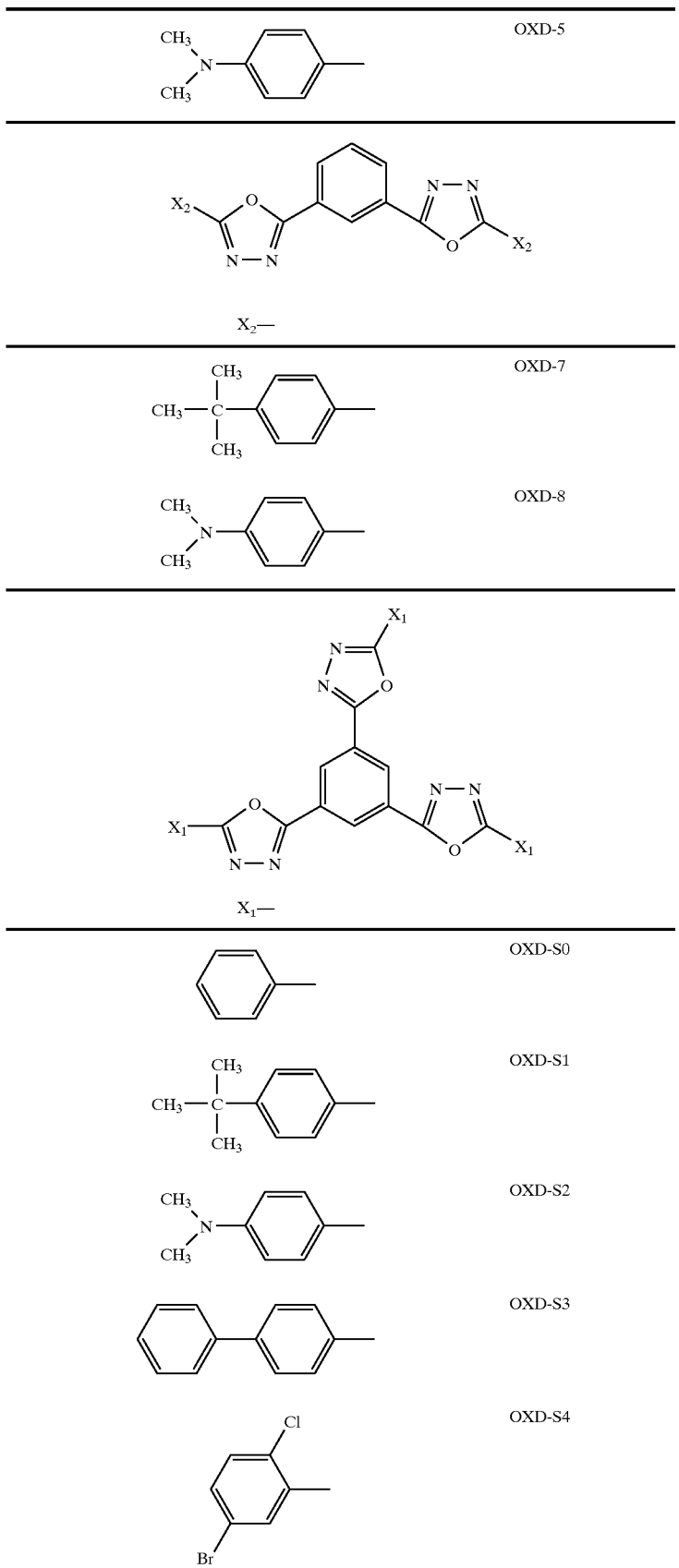

-continued
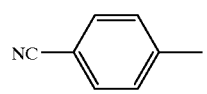 OXD-S5
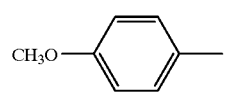 OXD-S6
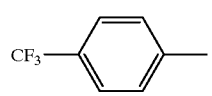 OXD-S7
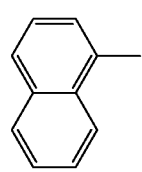 OXD-S8
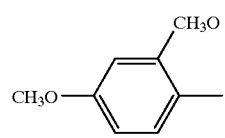 OXD-S9
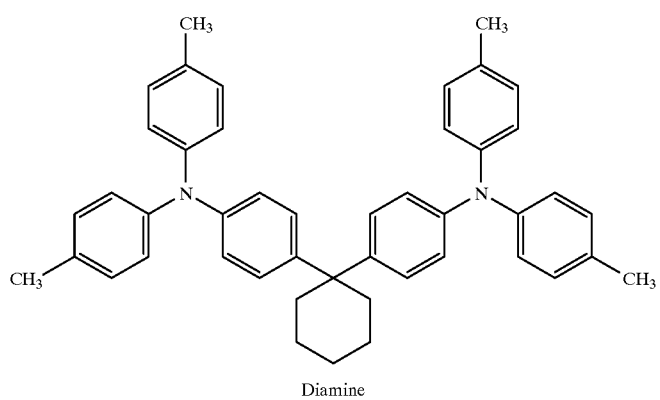
Diamine
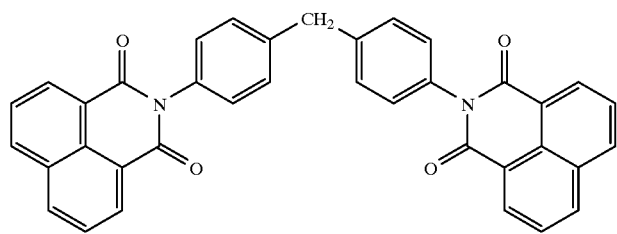
BNIBPC -continued
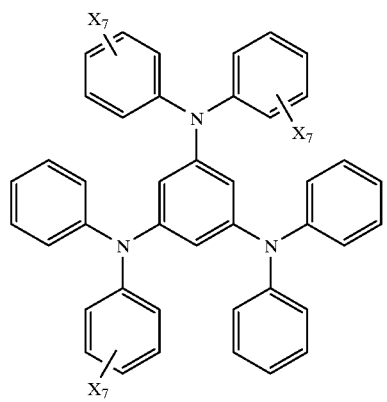
X₇—
| | |
|---|---|
| H— | TDAB |
| m-CH₃— | m-MTDAB |
| p-CH₃— | p-MTDAB |
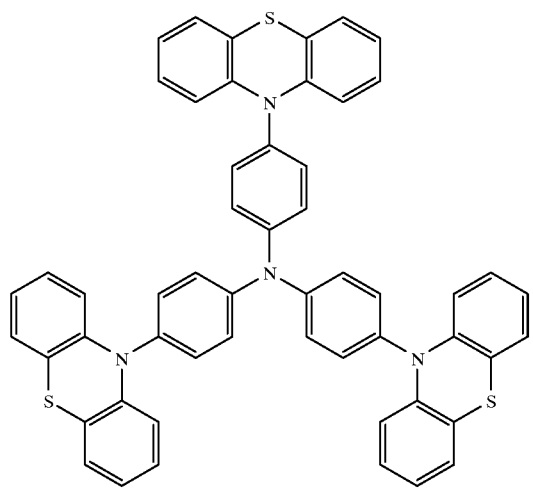
TPTTA
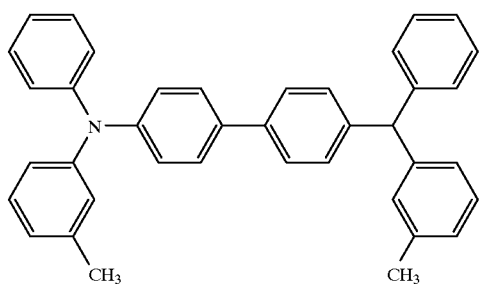
TDP -continued
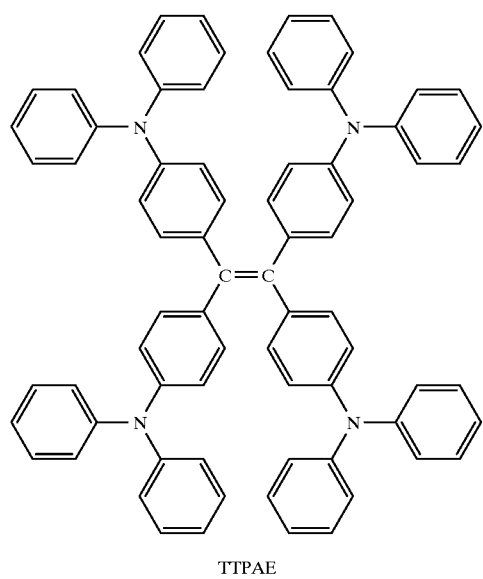
TTPAE
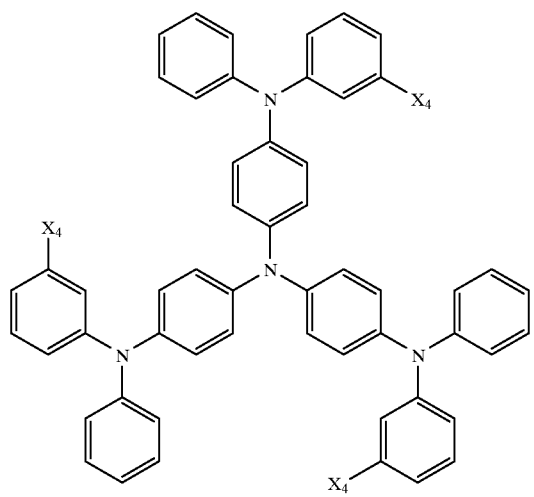
| $X_4$— | |
|---|---|
| H— | TDATA |
| $CH_3$— | MTDATA |
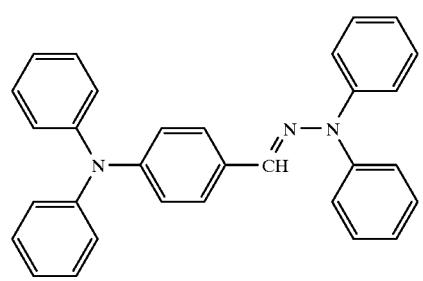
DPH

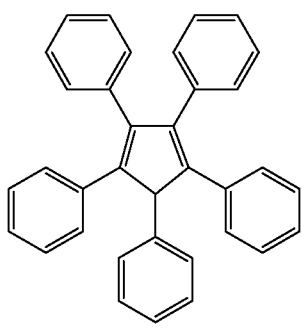
PPCP
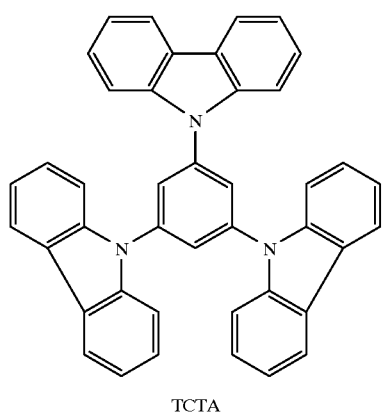
TCTA
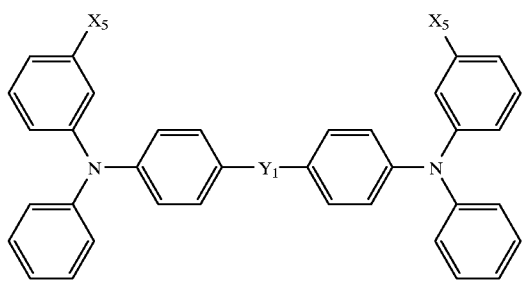
| —Y$_1$— | X$_5$— | |
|---|---|---|
| — | H— | D1 |
| — | CH$_3$— | D2 (TPD) |
| —CH=CH— | H— | D3 |
| —(CH$_3$)$_3$— | H— | D4 |
| —(CH$_3$)$_3$— | H— | D5 |

-continued

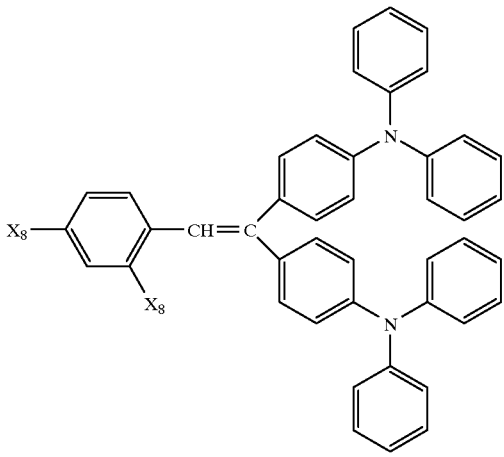

| $X_8$— | $X_9$— | |
|---|---|---|
| H— | H— | C1 |
| (CH₃)₂CH— | (CH₃)₂CH— | C2 |
| (CH₃)₃C— | H— | C3 |

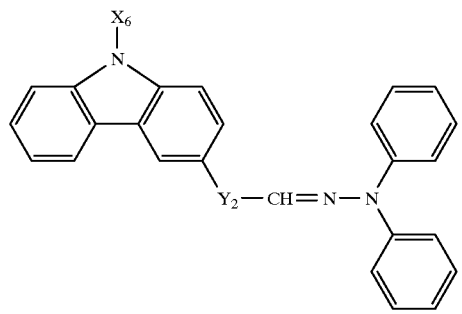

| —$Y_2$— | $X_6$— | |
|---|---|---|
| — | CH₃— | H3 |
| — | (CH₃)₂CH— | H4 |
| —CH=CH— | CH₃— | H5 |

In connection with materials of an high polymer amorphous organic film, many materials showing an amorphous structure are found in high polymers each containing a molecular chain which has irregular bonds, that is untactic polymers or copolymers. In particular, named are polystyrene, methylmethacrylate and styrene-butadien synthetic rubber. Moreover, many materials showing an amorphous structure are found in high polymers which have a branched or bridged structure and, for example, valcanized rubber and phenol resin are named. Furthermore, from a view point of a polarizability of constituent atoms, a Si based polymer, that is polysilane, is more effective than a C based polymer. It is important that a main chain of polysilane is arranged in parallel to the surface of a substrate and it is located at as close a position to the surface as possible. In addition to that, from a view point that an induced dipole is easy to be generated with and molecules composing a crystalline thin film, it is effective to use a conductive high polymer such as a conductive polypyrrole, conductive polyaniline and conductive polythiophene.

When it is required to apply an electric field to a crystalline organic thin film having a functionality in an application to an electronic element, it is preferable for an organic amorphous film to have not only a surface planarity but an insulating capacity. It is preferable that such an insulating film is as thin as possible in order that a strong electric field is applied to a functional film at low a voltage as possible. For the purpose, it is preferable to form an organic amorphous molecule with a lower molecular weight, which is capable for forming a ultra thin film, by means of an evaporation method and the like. As a molecule which constitutes an organic film having such a feature, a molecule having a steroid based skelton can be named, for example.

An amorphous organic film made of any of kinds of molecule having a steroid based skelton can be used to form a stack structure made of different kinds of amorphous organic film in combination with the above mentioned amorphous organic films made of a lower molecular weight or of a high polymer. When sufficient thermal resistance cannot be realized with using only a lower molecular weight amorphous organic film, higher molecular weight amorphous organic film along with the lower molecular weight amorphous organic film may be used so that thermal resistance can be improved. Thermal resistance is important to perform a process for forming an electrode.

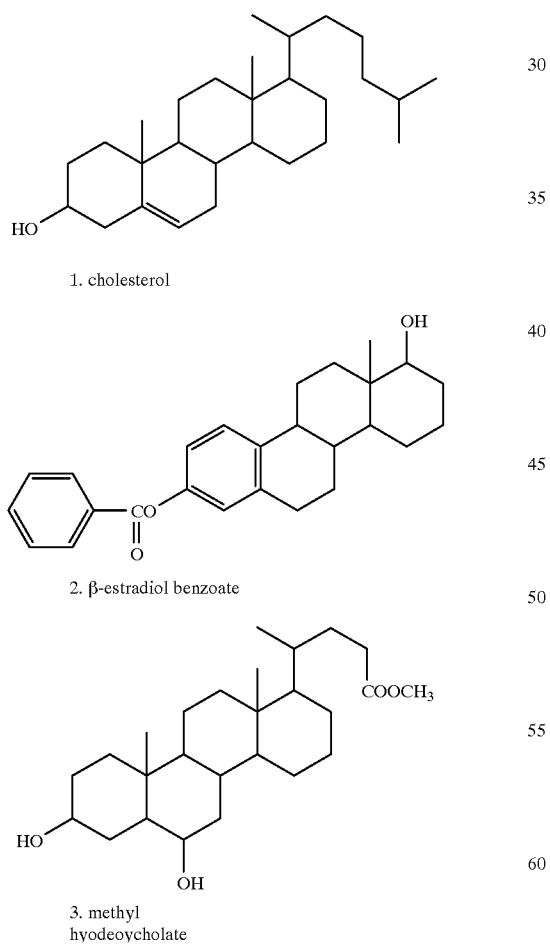

1. cholesterol

2. β-estradiol benzoate 3. methyl hyodeoycholate

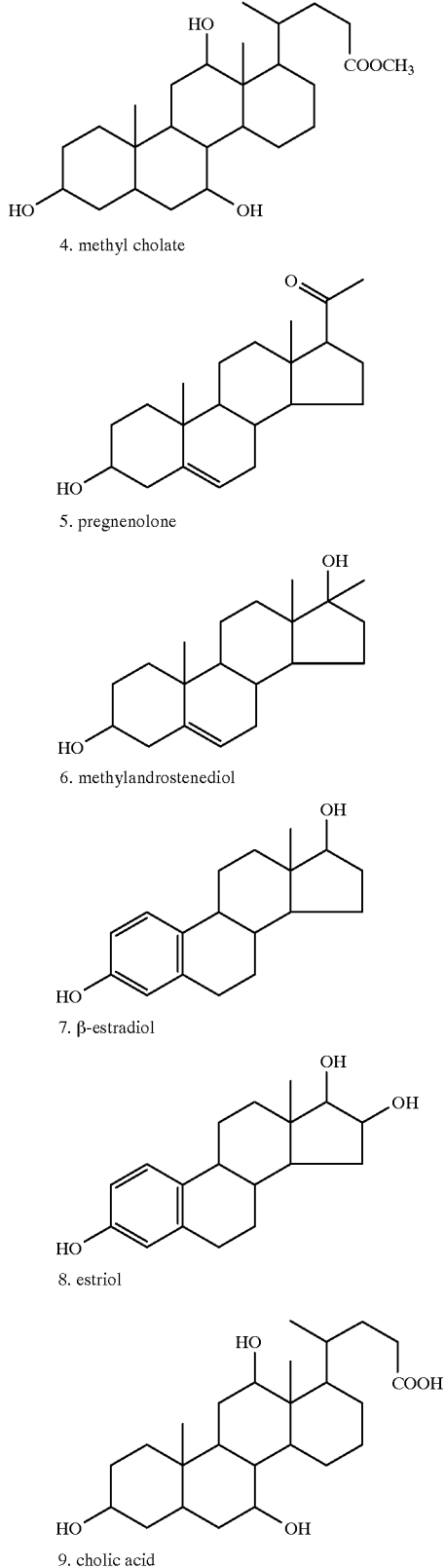

4. methyl cholate 5. pregnenolone 6. methylandrostenediol

7. β-estradiol 8. estriol 9. cholic acid

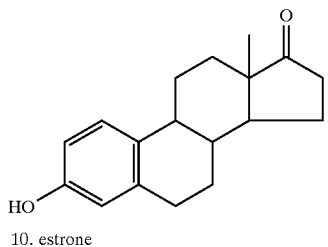

10. estrone

As molecules with a steroid based skelton, named are the following molecules:

Examples in application of a light control element of the present invention will be described below:

A light control element of the present invention can be used as devices such as an optical Kerr cell, a waveguide element, an optical bistable element and etalon.

Figure 6:
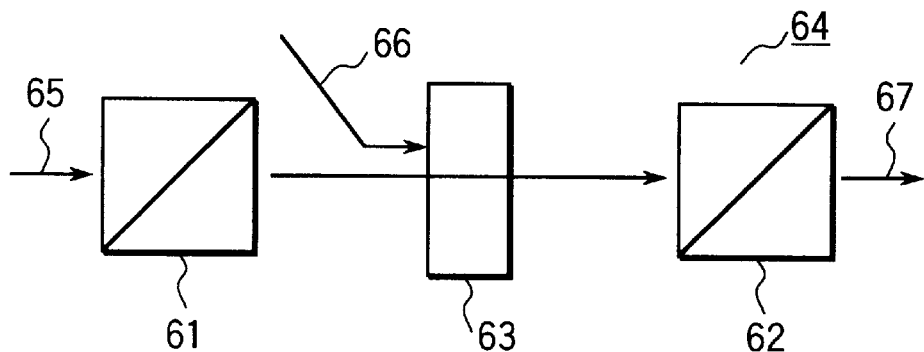
FIG. 6 is an internal arrangement of an optical shutter using a light control element of the present invention.

In FIG. 6, an internal arrangement of an optical shutter using a light control element of the present invention is shown.

In FIG. 6, reference marks 61, 62 indicate polarizers. Theses polarizers 61, 62 are disposed in such a manner that major surfaces of them facing each other may be in parallel with each other in order to achieve a polarized beam which advances straightforward. A light control element of the present invention is inserted as a optical Kerr cell 63 between the polarizers 61, 62 to form a optical shutter 64.

When a predetermined voltage is applied and control light 66 is radiated to the Kerr cell 63, anisotropy arises in refractive index of a crystal making a light control layer and, as a result, incident signal light 65 to the polarizer 61 is transformed to an elliptically polarized wave after transmission through the optical Kerr cell 63. Therefore, an on/off control of output light 67 coming out from the polarizer 62 can be controlled by controlling of radiation or non-radiation of control light 66.

An element in which a phase of a light wave propagating through a waveguide is controlled using changes in refractive index in the waveguide to effect light modulation is called a waveguide element, which is well known as a Mach-Zehnder interferometer type waveguide element, an optical-directional-coupler waveguide element or the like.

Figure 7:
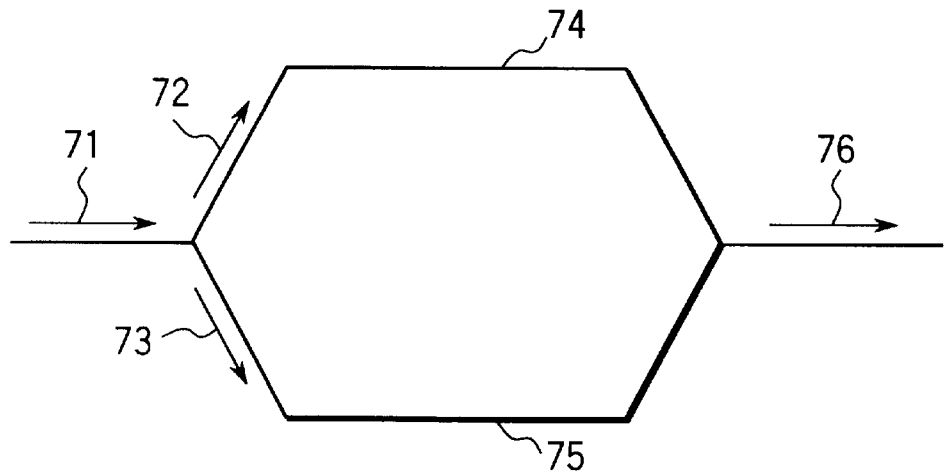
FIG. 7 is a diagram illustrating an operational principle of a Mach-Zehnder interferometer waveguide element using a light control element of the present invention.

In FIG. 7, a diagram illustrating an operational principle of a Mach-Zehnder interferometer waveguide element using a light control element of the present invention is shown.

In a waveguide element shown in FIG. 7, signal light 71 is branched into signal light beams 72, 73, the signal beams 72, 73 are guided through branches 74, 75, thereafter, are superimposed into one optical beam to come out as an output light 76. The branches 74, 75 are constructed with light control elements of the present invention, which can make it possible to produce a difference in refractive index between the branches.

In general, one of the branches 74, 75, for example the branch 74, has a predetermined voltage applied. In this situation, however, there does not arise any difference in refractive index between the branches and, accordingly the signal beams 72, 73 can be output in the same phase.

If control light with a predetermined intensity is radiated to this waveguide element, a refractive index of the branch 74 is changed in a non-linear manner and, thereby, a difference in refractive index between the branches 74 and 75 arises according to a magnitude of change in intensity of control light. As a result, a large difference in phase between the signal beams 72 and 73 arises to reduce an intensity of an output light 76.

Figure 8:
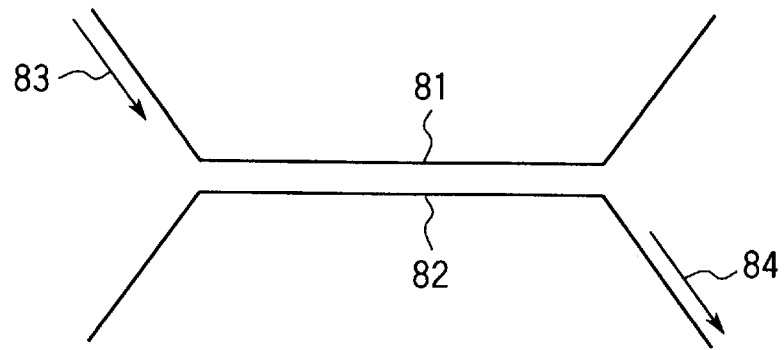
FIG. 8 is a diagram illustrating an operational principle of a directional coupler waveguide element using a light control element of the present invention.

In FIG. 8, a diagram illustrating an operational principle of a directional coupler waveguide element using a light control element of the present n is shown.

In a waveguide element shown in FIG. 8, two arms 81, 82 are disposed in parallel and at a close position to each other and incident signal light 83 to the arm 81 comes out from the arm 82 as output light 84.

The arms 81, 82 are constructed with light control elements of the present invention, in a normal condition, the arms 81, 82 are under application of a predetermined voltage and there arises no change in refractive index in a non-linear manner. That is, since the arms 81, 82 are in mode matching, the signal light 83 can be transferred from the arm 81 to the arm 82 in a complete manner.

However, if control light is radiated to the arm 81, a refractive index of the arm 81 is changed in a non-linear manner to produce a large difference in refractive index between the arms 81 and 82. As a result, mode matching is broken and optical transfer becomes incomplete, which is further resulted in reduction in intensity of the output light 84.

Figure 9:
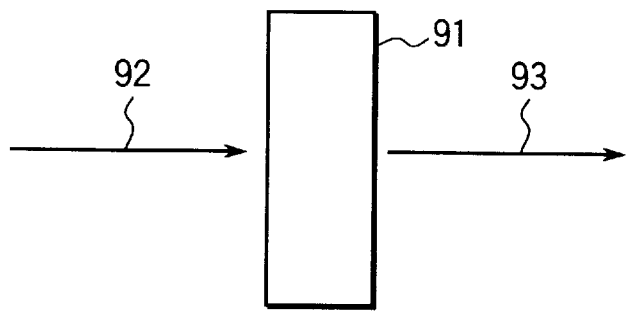
FIG. 9 is a diagram illustrating an operational principle of an etalon using a light control element of the present invention.

In FIG. 9, a diagram illustrating an operational principle of an etalon using a light control element of the present invention is shown.

In this figure, a light control element of the present invention is used as an etalon 91 and signal light 92 comes in one major surface of the etalon as incident light and comes out from the other major surface of the etalon 91 as output light. A refractive index is changed according to changes in control light intensity and, therefore, a wavelength of a light wave propagating a medium receives modulation. As a result, an intensity of a multiple-reflection synthetic wave coming out from the output side, that is an intensity of the output light, is changed. This etalon can be made extremely smaller in size compared with a waveguide element and, thereby, the etalon is suitable for an optical integrated circuit, a two-dimensional image processing element and the like.

EAMPLES

Examples of light control elements of the present invention are described below:

Example 1-1

A light control element was fabricated in the process described below.

First of all, an aluminum film as an electrode layer is formed on a quartz substrate of a thickness of 2 mm in a manner that the aluminum film has a reflectance of 0.9 and a thickness of 150 Å. On this aluminum film, the following films were formed by means of a vacuum evaporation method in the order: an $SrTiO_3$ film having a thickness of 500 Å with a dielectric constant of 200 as an insulator layer; and an amorphous film of tetratriphenylaminoethylene (TTPAE) having a thickness of 250 Å as a molecular orientation control film.

Next, a light control layer with a thickness of 200 Å made of a TMB-TCNQ complex was formed on the molecular orientation control film using tetramethylbenzidine (TMB) as a donor molecule and tetracyanoquinodimethane (TCNQ) as an acceptor molecule by means of a vacuum evaporation method. On this light control layer, the following films were successively formed by means of a vacuum evaporation method in the order: an insulator layer made of methylpolymethacrylate (PMMA) having a thickness of 200 Å and an aluminum film having a thickness of 150 Å with a reflectance of 0.9 as an electrode film. Thus, a light control element was fabricated and it is used as an etalon.

A non linear susceptibility of third order and a response speed were measured on this element by means of the following method:

First of all, the element was subjected to an electrostatic field of 10V to give an intensity of $1.0 \times 10^6$ V/cm in a light control layer. Pulse laser light with a wavelength of 1400 nm, 1 MW/cm$^2$ and 500 fs as control light and signal light was radiated to the light control layer of the element in a direction normal relative to the light control layer and the intensity of an output light was measured. The results are shown in FIG. 10.

Figure 10:
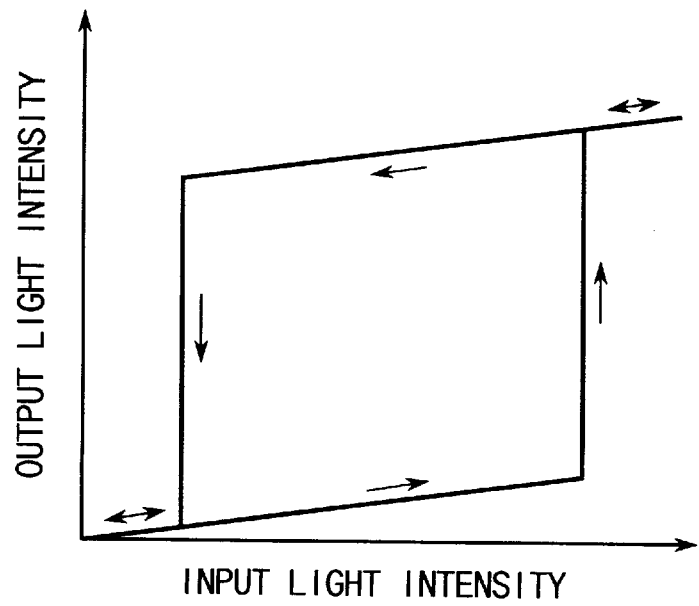
FIG. 10 is a graph showing a relationship between the incident light intensity and the output light intensity in a light control element according to a first embodiment of the present invention.

As shown in FIG. 10, this element shows an optical bistability. A switching time from an off state (a lower transmissivity state) to an on state (a higher transmissivity state), in other words from a neutral state to an ionic state, of the element was 700 fs and, to the contrary, a switching time from an on state to an off state was 800 fs. Besides, in the lower transmissivity state, a ratio of output light to input light was 0.1, whereas, in a higher transmissivity state, a ratio of output light to input light was increased up to the order of 0.4.

Example 1-2

A light control element was fabricated in a similar way to the way of the example 1-1 with exception that first and second electrode layers were 50 Å in thickness and 0.3 in reflectance. An electrostatic field was applied to cause a phase transition. As a result, it was found that the phase transition occurred when an electric field with an intensity of $2 \times 10^6$ V/cm was formed at an applied voltage of 20V.

Then laser light with a wavelength of 540 nm and an intensity of 0.5 MW/cm$^2$ was radiated as signal light and response speeds were measured when optical properties in the light control layer were controlled by application to non-application of a voltage of 25V. The results were that a switching time from an off state to an on state was 50 p sec and that a switching time from a charge transfer state to a non-bond state was 65 p sec.

In the non-bond state, a ratio in intensity of output light to input light was 0.60 and a ratio in intensity of output light to input light in the charge transfer state was 0.65.

Comparative example 1-1

The element fabricated in the example 1-1 was used and pulse laser light with a wavelength of 1400 nm, an intensity of 1 MW/cm$^2$ and 500 fs was radiated to the light control layer without application of a voltage. As a result, a bistability of the light control layer did not appear.

When an intensity of the laser light was strengthened, a trace of a behavior of bistabilization of the light control layer was recognized at an intensity of 1 GW/cm$^2$.

When a predetermined voltage was applied to the light control layer and control light as signal light was radiated, an excellent nonlinear susceptibility of third order and an excellent response speed were observed. Moreover, when a thickness and a reflectance of the film were changed to the same values as those of the example 1-2, the results were similar to the above. However, when no voltage was applied as was in the comparative example 1-1, a stabilization behavior was not obtained before an intensity of the laser light was strengthened to a considerably high level.

Example 1-3

A light control element was fabricated in a similar way to that of the example 1-1 with the exception that a thickness of a light control layer was 100 Å.

This element was formed so that a thickness of the light control layer was thinner as compared with that of the element fabricated in the example 1-1. Therefore, a gain of Madelung energy in an ionic state was reduced and, thereby, a state of a complex crystal making the light control layer is shifted closer to the phase conversion boundary. An excitation wavelength for a charge transfer exciton was shifted from 1400 nm to 1550 nm, that is to a lower energy side.

In measurement of output light from the element, an electrostatic voltage of 5V was applied to this element and pulse laser light with a wavelength of 1550 nm, an intensity of 1 MW/cm$^2$ and 500 fs was radiated control light serving as signal light to the light control layer in a perpendicular direction to the substrate. As a result, a hysteresis curve showing optical bistabilization was obtained.

Switching times from an off state to an on state and, to the contrary, from an on state to an off state were respectively 500 fs and 650 fs.

Example 1-4

A light control element was fabricated in a similar way to that of the example 1-1 with the exception that a light control layer with a thickness of 100 Å was formed using a complex crystal made of chlormethylparaphenylene-diamine (ClMePD)-dimethyldicyanoquinodiimime (DMeDCNQI) and dimethylparaphenylenediamine (DMePD)-DMeDCNQI at a mole ratio of the former to the latter of 3:7.

An electrostatic voltage of 5V was applied to a light control element and pulse laser with a wavelength of 1000 nm, an intensity of 0.8 MW/cm$^2$ and 500 fs was radiated to the light control layer serving as control light and signal light in a direction normal to the light control layer. Measurements on output light was conducted while an intensity of input light is changed and, as a result, a hysteresis curve showing optical bistabilization was obtained.

Switching times from an off state to an on state and, to the contrary, from an on state to an off state were respectively 650 fs and 730 fs.

Example 1-5

An electrostatic voltage of 10V was applied to the light control element fabricated in the example 1-1. A laser light with a wavelength of 1300 nm and an intensity of 0.1 MW/cm$^2$ was radiated perpendicular to the light control layer, while another pulse laser light with a wavelength of 1000 nm, an intensity of 0.8 MW/cm$^2$ and 500 fs was radiated in an oblique direction with respect to the light control layer as control light to a region in the light control layer, where the signal light kept radiated. Output light was measured and, as a result, a hysteresis curve showing optical bistabilization was obtained.

Switching times from an off state to an on state and, to the contrary, from an on state to an off state were respectively 700 fs and 800 fs.

Example 1-6

A light control element was fabricated in a similar way to that of the example 1-1 with the exception that an aluminum film with a reflectance of 0.4 and a thickness of 50 Å was formed as an electrode layer and a light control layer with a thickness 150 Å was formed using a TTF-CA complex crystal made of tetrathiafulvarene (TTF) as donor molecule and chloranil (CA) as acceptor molecule. This element has a low reflectance and, thereby, is a light control element which has a shape of a plane using no internal multiple reflection like an etalon.

An electrostatic voltage of 10 V was applied to the element and pulse laser with a wavelength of 1550 nm, an intensity of 1 MW/cm$^2$ and 500 fs was radiated to the light control layer as control light and signal light in a direction normal to the light control layer. Measurements on output light was conducted and, as a result, a hysteresis curve in a graph showed that optical bistabilization was obtained.

Switching times from an off state to an on state and, to the contrary, from an on state to an off state were respectively 650 fs and 800 fs.

Example 1-7

A pulse laser light with a wavelength of 540 nm and an intensity of 1 MW/cm$^2$ was radiated to the light control layer of the light control element fabricated in the example 1-1 in a direction normal to the light control layer and a rectangular voltage modulated with 1 GHz was applied to the same light control layer while the voltage was changed in the range of 0V to 30V. As a result, the element was in a lower transmissivity state in a voltage range of 20V or less and in a higher transmissivity state in a voltage range of 20V or more, and an optical pulse modulated signal in synchronization with modulation of a voltage signal was obtained.

Example 1-8

A light control element shown in FIG. 11 was fabricated in the following process:

First of all, an aluminum film with a thickness of 1000 Å was formed as an electrode film 112 on a quartz substrate 111 in the shape of a square plate with a thickness 2 mm and one side length of 20 mm.

On the electrode layer 112, the following layers were formed by means of a vacuum evaporation method in the order: an SrTiO3 film with a thickness 500 Å and a dielectric constant of 200 as an insulator layer 113 and a TTPAE amorphous film with a thickness of 250 Å as a molecular orientation control layer 117.

Then, using TTF as donor molecule and CA as acceptor molecule, a light control layer 114 made of TTF-CA complex with a thickness of 150 Å was formed on the molecular orientation control layer 117 by means of a vacuum evaporation method. On the light control layer 114, the following films were further in succession formed by means of a vacuum evaporation method in the order: an insulator layer 115 with a thickness of 200 Å made of PMMA and an electrode layer 116 with a thickness 500 Å made of an aluminum film. The electrode layer 116 was formed in the middle portion of the substrate in the shape of a rectangle with a length of 10 mm and a width of 5 mm.

On the substrate 111 on which the above mentioned layers were already stacked, a pair of prisms 118, 119 were mounted at both ends in a length direction of the electrode layer 116 to form a light control element used as a prism coupler slab optical waveguide element.

An electrostatic voltage of 5V was applied to the element and pulse laser light with a wavelength of 1550 nm and an intensity of 0.1 MW/cm$^2$ was radiated through the prism 118 as signal light and another pulse laser light with a wavelength of 1440 nm and an intensity of 1 MW/cm$^2$ was radiated through the prism 119 as control light to measure an intensity of output light. As a result, output of the signal light was completely shut off when the control light was radiated.

Switching times of the waveguide element from an on state to an off state and from an off state to an on state were respectively 700 fs and 800 fs.

Example 1-9

Figure 12:
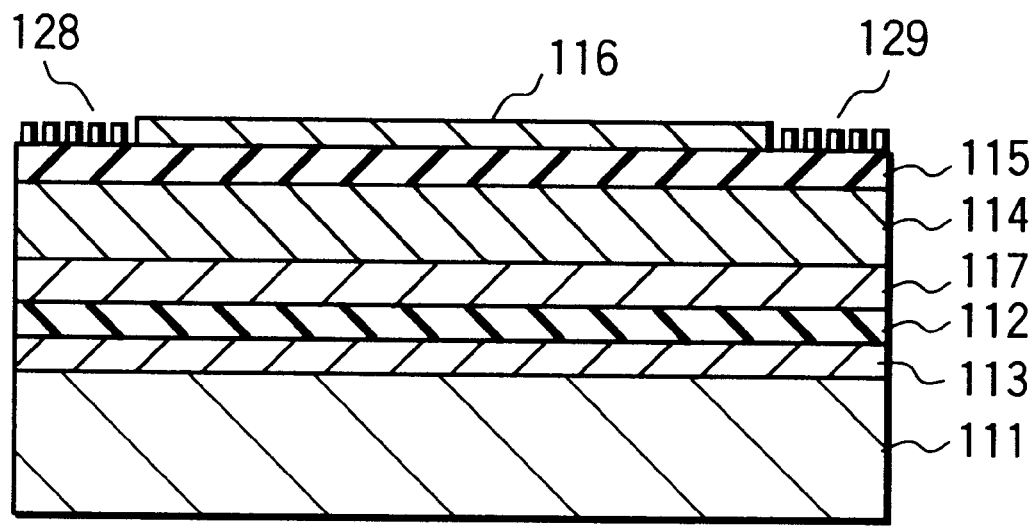
FIG. 12 is a schematic sectional view of a light control element according to example 7.

A light control element used as a grating coupler slab waveguide element, as shown in FIG. 12, was fabricated.

Figure 11:
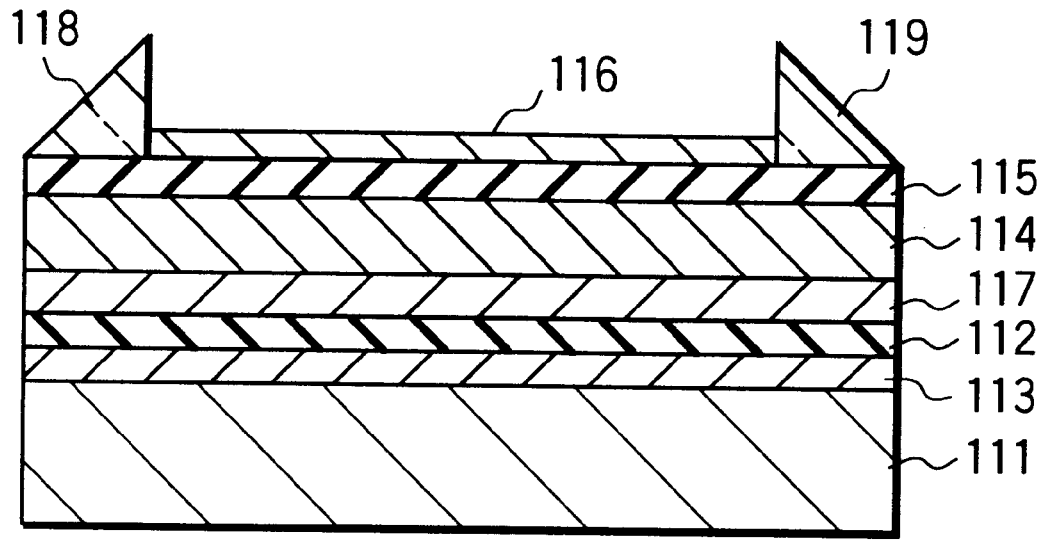
FIG. 11 is a schematic sectional view of a light control element according to example 6.

The element shown in FIG. 12 has almost the same structure as that of FIG. 11, but is different in that gratings 128, 129 are formed instead of the prisms 118, 119.

An electrostatic voltage of 5V was applied to the element and pulse laser light with a wavelength of 1550 nm and an intensity of 0.1 MW/cm$^2$ was radiated through the grating 128 as signal light and another pulse laser light with a wavelength of 1440 nm and an intensity of 1 MW/cm$^2$ was radiated through the grating 129 as control light to measure an intensity of output light. As a result, output of the signal light was completely shut off when the control light was radiated.

Switching times of the waveguide element from an on state to an off state and from an off state to an on state were respectively 700 fs and 800 fs.

Example 1-10

Pulse laser light with a wavelength of 540 nm and an intensity of 0.1 MW/cm$^2$ was radiated to the light control element fabricated in the example 1-8 through one prism and a rectangular voltage modulated in 1 G Hz was applied with changes in the range of 0V to 30V. As a result, the element was in a lower transmissivity state in the range of 20V or less and in a higher transmissivity state in the range of 20V or more, and an optical pulse modulated signal synchronized with modulation of the voltage signal can be obtained.

Example 1-11

Figure 13:
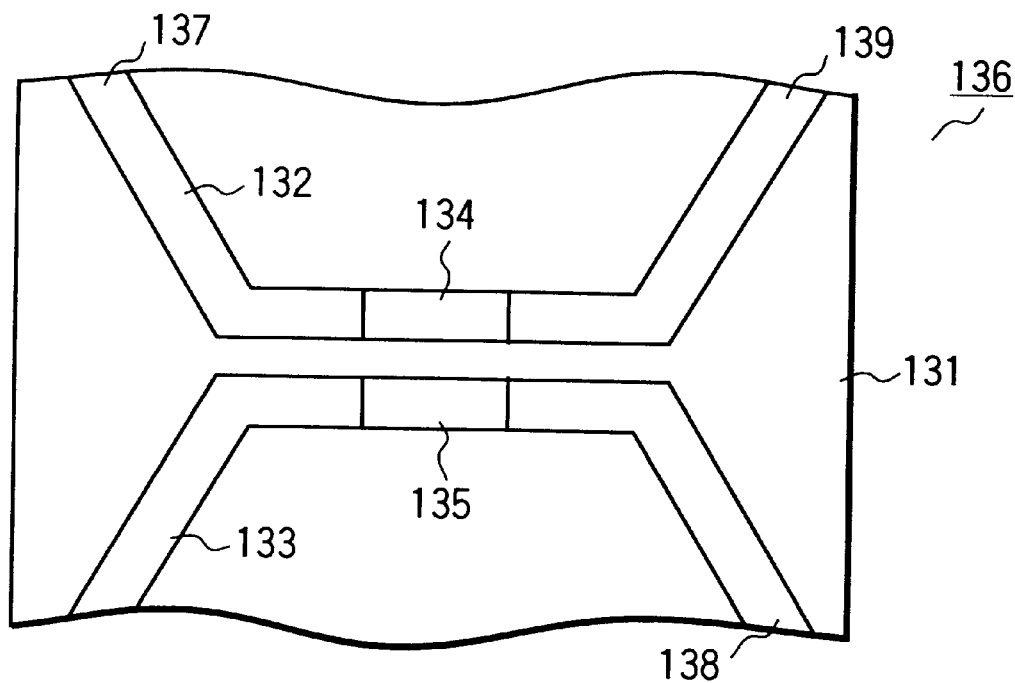
FIG. 13 is a schematic view showing a directional coupler waveguide element according to example 8.

A directional coupler waveguide element of FIG. 13 was fabricated in a process as shown below:

First of all, patterning was given on a quartz substrate 131 and, then, arms 132, 133 made of 7059 glass were formed with spattering. Widths and thicknesses of the arms 132, 133 were 2 μm and 0.2 μm respectively. Gaps for housing light control elements 134, 135 were formed in the arms 132 and 133.

In the respective gaps of the arms 132, 133, aluminum films with a thickness of 500 Å as electrode layers were formed with mask. On the aluminum film, SrTiO$_3$ films with a thickness of 500 Å and a dielectric constant of 200 were formed as an insulator layer by means of a vacuum evaporation method and amorphous films made of TTPAE with a thickness of 250 Å was then formed on the SrTiO$_3$ films as a molecular orientation control layer by means of the same method.

On the thus formed molecular orientation control layer, a light control layer with a thickness of 500 Å made of TMB-TCNQ complex using TMB as donor molecule and TCNQ as acceptor molecule was formed by means of a vacuum evaporation method. Finally, an insulator layer made of PMMA with a thickness of 200 Å and an electrode layer made of an aluminum film with a thickness of 500 Å were in succession formed on the light control layer by means of a vacuum evaporation method, so that light control sections 134, 135 were completed and thus a directional coupler waveguide element 136 was fabricated.

A voltage of 30V was only applied to the light control section 134 of the directional coupler waveguide element 136 thus fabricated and pulse light with a wavelength of 1550 nm and 500 fs was radiated through an input section 137 of the arm 132, while an intensity of the pulse light was changed. The results were as follows: When an intensity was less than 1 MW/cm$^2$, output light was recognized from an output section 138 of the arm 133. When an intensity was 1 MW/cm$^2$ or more, no output light was recognized from the output section 138 of the arm 133 and output light was recognized from an output section 139 of the arm 132 only.

Switching times of the waveguide element from a non-bond state to a charge transfer state and from a charge transfer state to a non-bond state were respectively 1.4 fs and 2.1 fs.

Example 1-12

Figure 14:
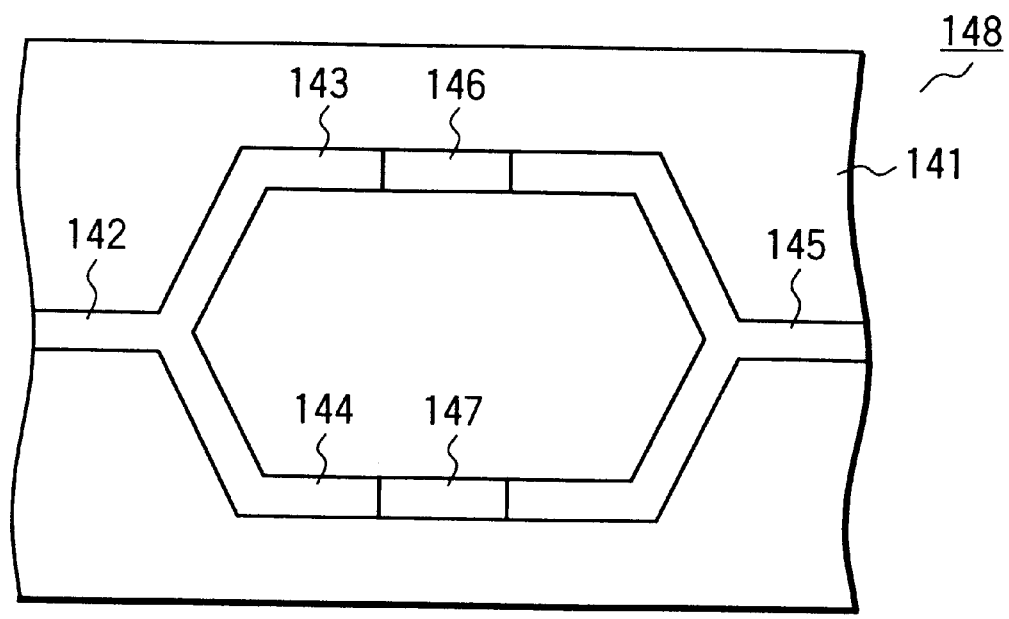
FIG. 14 is a schematic view showing a Mach-Zehnder interferometer waveguide element according to example 9.

A Mach-Zehnder type waveguide element shown in FIG. 14 was fabricated in a process shown below:

First of all, waveguides 142, 145 and branches 143, 144 made of 7059 glass were formed on a quartz substrate 141 by patterning and spattering so as to each have a section of a width of 2 μm and a thickness of 0.2 μm. Gaps for housing light control elements 146, 147 were formed in the branches 143, 144.

Next, aluminum films with a thickness of 500 Å as electrode layers were formed in the respective gaps of the branches 143, 144 using mask. On the aluminum film, an SrTiO$_3$ films each with a thickness of 500 Å and a dielectric constant of 200 were formed as an insulator layer by means of a vacuum evaporation method and an amorphous film made of TTPAE with a thickness of 250 Å was then formed on the SrTiO$_3$ film as a molecular orientation control layer by means of the same method.

On the thus formed molecular orientation control layer, a light control layer with a thickness of 500 Å using TMB as donor molecule and TCNQ as acceptor molecule was formed by means of a vacuum evaporation method. Finally, an insulator layer made of PMMA with a thickness of 200 Å and an electrode layer made of an aluminum film with a thickness of 500 Å were in succession formed on the light control layer by means of a vacuum evaporation method, so that light control elements 146, 148 were completed and thus a directional coupler waveguide element 148 was fabricated.

A voltage of 30V was only applied to the light control section 146 of the directional coupler waveguide element 148 thus fabricated and pulse light with a wavelength of 1550 nm and 500 fs was radiated through the waveguide 142, while an intensity of the pulse light was changed. The results were as follows: When an intensity was less than 1 MW/cm$^2$, output light was recognized from the waveguide 145. When an intensity was 1 MW/cm$^2$ or more, no output light was recognized from the waveguide 145.

Switching times of the waveguide element from a non-bond state to a charge transfer state and from a charge transfer state to a non-bond state were respectively 1.6 fs and 2.5 fs.

Next, an organic thin film element of the present invention will be described below:

In an organic thin film element of the present invention, an amorphous organic film which is preferably used in the above mentioned light control elements and molecules having a steroid based skelton which are more preferably used in them are used for a molecular orientation control layer.

An organic thin film element of the present invention has a stack structure formed on a support layer, said stack structure basically comprising a molecular orientation control layer made of an amorphous organic film and a crystalline organic thin film having π electron system molecules formed on a support layer. The crystalline organic thin film is formed by means of a vacuum evaporation method at a growth speed of 100 Å/min or less and a thickness is in the range of an unimolecular layer to 2000 Å.

A method of the present invention has a feature that it is used for fabricating such an organic thin film element and comprises the steps of: forming a molecular orientation layer with an amorphous organic film as the surface of the support layer and then forming a crystalline organic thin film with a thickness in the range of an unimolecular layer to 2000 Å on the amorphous organic film at a growth speed of 100 Å/min or less by means of a vacuum evaporation method.

Here, the support layer means a layer for supporting a molecular orientation control layer. The support layer can be disposed adjoining a molecular orientation control layer according to kinds of use of an organic thin film and a desired structure. As a typical example of a support layer, a substrate is named, but it is not limited to a substrate itself; a layer which is preferably used for an organic thin film element such as an insulator layer, a crystalline organic thin film or the like is selected. If a layer other than a substrate is used as a support layer, a substrate can be disposed under the support layer, when any layer can be inserted between the support layer and the substrate.

According to a first preferred embodiment of an organic thin film element of the present invention, coloring molecules of a lower molecular weight with an aromatic ring at the outermost crust in molecular structure can be used in a molecular orientation control layer. With the use of the coloring molecules, a strong dispersion force can be generated between the molecular orientation control layer and π electron system molecules constructing a crystalline organic thin film formed on the molecular orientation control layer, since there are a high polarizability of delocalized π electrons in a aromatic ring. And it is possible to make efficient use of properties characteristic of an organic thin film with a high crystallinity and also to obtain an organic thin film element having advantage due to anisotropy in a direction of crystallographic axis.

Besides, according to a second preferred embodiment of the organic thin film element of the present invention, a polysilane derivative whose main chain is oriented in parallel to the surface of a substrate can be used as a molecular orientation control layer made of an amorphous organic thin film. When a molecular orientation control layer is constructed by silicone polymer chains, the silicone polymer chains have a higher electron polarizability than that of a carbon based polymer chain and, thereby, a higher dispersion force between the orientation control layer and π electron system molecules constructing the organic thin film can be produced compared with the case where a carbon based polymer is used as a material of the orientation control layer. And it is possible to make efficient use of properties characteristic of an organic thin film with a high crystallinity and also to obtain an organic thin film having advantage due to anisotropy in a direction of crystallographic axis.

According to a third preferred embodiment of an organic thin film element of the present invention, an organic thin film substantially consisting of molecules with a steroid based skelton can be used as a molecular orientation control layer made of an amorphous organic thin film. With the use of an organic thin film substantially consists of molecules with a steroid based skelton, an organic amorphous layer with a surface flatness and an insulating capacity can be obtained. Such an insulating film can be made in a thin form and, accordingly, a stronger electric field can be employed at a lower applied voltage.

According to a fourth referred embodiment of an organic thin film element of the present invention, as a molecular orientation control layer made of an amorphous organic thin film, a stack structure can be used, wherein the structure has a mixed stack structure comprising different amorphous organic thin films and it is the mixed stack structure including at least one organic thin film substantially made of molecules each having a steroid based skelton. When sufficient thermal resistance cannot be realized with using only a lower molecular weight amorphous organic film, higher molecular weight amorphous organic film along with the lower molecular weight amorphous organic film so that thermal resistance can be improved. Thermal resistance is important to perform a process for forming an electrode.

According to a fifth preferred embodiment of an organic thin film element of the present invention, a structure with a mixed stack structure constructed with thin films made of different organic molecules can be used as a crystalline organic thin film having $\pi$ electron system molecules. In this case, there arises possibilities that a charge transfer effect occurring at a hetero-interface between different kinds of organic molecules, generation of a distribution of contact potentials and a confinement effect of carriers or excitons by creation of a potential barrier, which allows development of an organic thin film element having a new function.

According to a sixth preferred embodiment of the organic thin film element of the present invention, an organic charge transfer complex crystal can be used as a crystalline organic thin film having $\pi$ electron system molecules. If this is the case, since a phase transition phenomenon characteristic of a charge transfer complex, anisotropic electric conductivity, and higher non-linear optical characteristics can be used as functions of an element, an organic thin film element with a new function can be obtained.

According to a seventh preferred embodiment of the organic thin film element of the present invention, a crystalline organic thin film having an optical modulating function or an optical information recording function, which functions are based on a non-linear optical effect, can be used. With the use of such crystalline organic thin films, the following physical properties and effects, which are peculiar to an organic $\pi$ electron system molecule, can be practically used in an organic thin film element, singly or in combination: a higher non-linear optical susceptibility; a ultra high optical responsibility; an optical absorptivity or reflectivity which is sensitive to a molecular electronic state and a molecular cohesive structure; a photolithography effect which shows a high responsibility by electron transfer between molecules at a high speed; and a hole burning effect.

According to a eighth preferred embodiment of the organic thin film element of the present invention, a pair of insulator layers and a pair of electrode layers can be formed on both side surfaces of a stack structure constructed with a molecular orientation control layer made of an amorphous organic film and a crystalline organic thin film having $\pi$ electron system molecules. With the pair of insulator layers used, effective application of an strong electric field to an organic thin film can be possible and, thereby, an organic thin film element using controllability of an electronic state thereof by an electric field can be obtained.

According to a ninth preferred embodiment of the organic thin film element of the present invention, a crystalline organic thin film with a function that produces an optical electromotive force or an optical current by optical illumination can be used. If such a crystalline organic thin film is used, an organic thin film element used for a photodetector or a photocell can be obtained.

According to a tenth preferred embodiment of an organic thin film element of the present invention, it is possible to obtain an organic thin film element, wherein a stack structure comprising an insulator film, a molecular orientation control film made of an amorphous organic thin film, a gate electrode and a crystalline organic thin film having $\pi$ electron system molecules is formed on a channel region between source/drain regions of a semiconductor substrate. The crystalline organic thin film is formed at a growth speed of 100 Å/min or less by means of a vacuum evaporation method and a thickness of the film is in the range of an unimolecular layer less than 2000 Å. Such an organic thin film element can be used as a field effect transistor.

The present invention can provides an organic thin film element which can be practically used as an optical element or an electronic element, since a structure of an organic thin film and molecular orientation can be controlled regardless of properties and a shape of a substrate.

Figure 15:
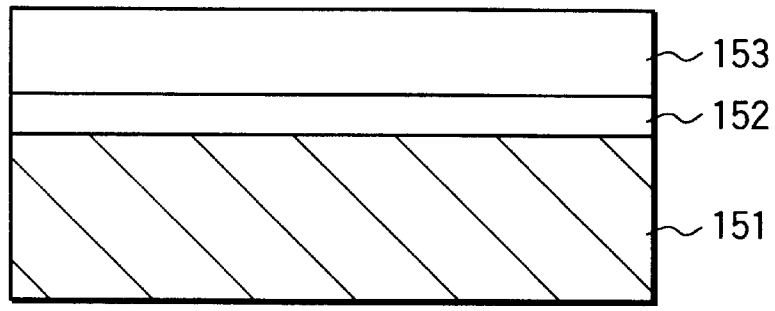
FIG. 15 is a schematic sectional view of an example of a structure of an organic thin film element of the present invention.
Figure 16:
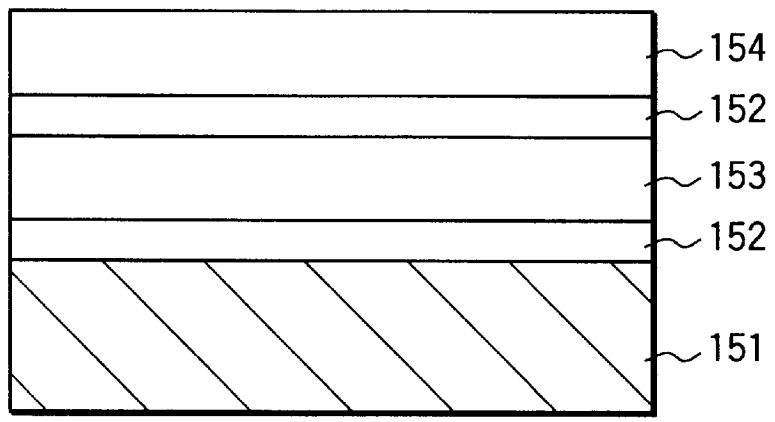
FIG. 16 is a schematic sectional view of another example of a structure of an organic thin film element of the present invention.
Figure 17:
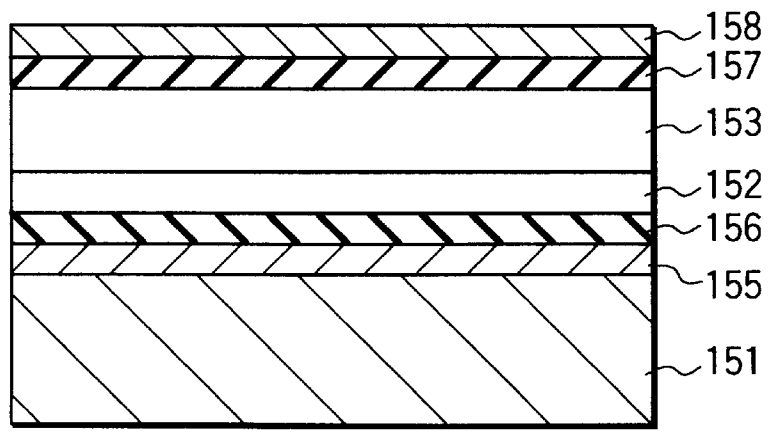
FIG. 17 is a schematic sectional view of still another example of a structure of an organic thin film element of the present invention.

Next, examples of actual structures of organic thin film elements of the present invention will be described:

An organic thin film element of the present invention basically has an organic film, which is at least one layer formed on a support layer such as a substrate, and has a function of element. In FIGS. 15 to 17, examples of organic thin film elements of the present invention are shown.

An organic thin film element of FIG. 15 is an element which is fabricated by in succession forming an amorphous organic film 152 and an organic thin film 153 which is responsible for a function of element on a substrate 151.

An organic thin film element of FIG. 16 is a stack organic thin film element which is fabricated by in succession forming an amorphous organic film 152, a first organic thin film 153 which is responsible for a function of element, an amorphous organic film 152 and a second organic film 154 which is also responsible for a function of element on a substrate 151.

An organic thin film element of FIG. 17 is an organic thin film element, in which, on a substrate 151, the following films are successively formed in the order: a first electrode 155, a first insulator layer 156, an amorphous organic film 152, an organic thin film 153 which is responsible for a function of element, a second insulator layer 157 and a back surface electrode 158 as a second electrode.

In the present invention, as shown in FIG. 15 to 17, a molecular orientation control layer made of an amorphous organic film is formed on the surface of desirable substrate. The orientation control layer can be formed by any of a vacuum evaporation method, a spin coat method, a brush coat method, a sputtering method and a LB method.

A thickness of a molecular orientation control layer which is formed as a substrate for an organic thin film is preferably in the range of an unimolecular layer to about 1000 Å. That is, a thickness is only required to be equal to about a distance between a orientation control layer and molecules in a thin film within which an interaction can works and, if a thickness is thicker than necessary, it automatically gives an adverse influence on an applied voltage or reflects loss in optical transmissivity of an element in a working condition. Working distances of the interaction are different according to different kinds of interactions but, in the case where a dispersion force is a main source of interaction, a thickness of several molecular layers is proper for a thickness of a molecular orientation control layer, while a thickness in the range of 100 to 1000 Å is proper when utilizing a force which affects up to a more distant point such as an electrostatic force.

In the present invention, an organic thin film designates a crystalline thin film of π electron system molecules, A π electron system molecule means a molecule which has some number of π bonds in a molecule, such as an unsaturated hydrocarbon and an aromatic compound. In a concrete manner, polydiacethylene, a condensed polycyclic aromatic molecule are of typical of the kind.

Control of conditions for growth of a thin film is extremely important in order to form a crystalline thin film made of π electron system molecules on a molecular orientation control layer. In a evaporation method under a common degree of vacuum ($10^{-6}$ to $10^{-7}$) as reported conventionally, it has been a standard understanding that a fairly high evaporation speed, such as 1000 Å/min is required to adhere film molecules on the surface of a substrate against a back pressure. However, thin film growth under such a condition is actually a growth condition to accelerate self-cohesion between molecules and, as a result, in many cases, a grown film has a cohesive structure of polycrystalline particles. In order to avoid such film growth, film growth should be conducted in such a manner that a ultra high degree of vacuum is used, conditions for slow film growth at a very low speed is selected and moreover an interaction between the substrate and molecules or an intermolecular interaction are seriously considered so as to advance film growth while constructing a crystalline structure.

As such film growth conditions, a film growth speed is preferably 100 Å/min or less and a degree of vacuum is preferably higher than $10^{-9}$, wherein, if a degree of vacuum is $10^{-8}$ or lower, the above mentioned back pressure effect starts to work and there arises an inclination that a deposition speed of organic molecules cannot be slowed down.

The most suitable film thickness of a crystalline thin film having π electron system molecules is variable according to a function of an element, but it is common that there is an upper limit of a film thickness and, more particularly, a thickness of a film is generally set in the range of an unimolecular layer to 1000 Å, or more preferably an unimolecular layer to 2000 Å in order to exhibit an element function sufficiently, that is, to avoid application of an unnecessary voltage or not to cause loss in current for the case of an electronic element and to avoid loss caused by absorption and the like for the case of an optical element.

A material of a substrate body is not limited to a particular material, but metal, semiconductor (including semiconductor in which a circuit or a junction has been fabricated), dielectric and quartz are named as a material for use.

When an electrode is formed on a substrate as in the case of an organic thin film shown in FIG. 17, there are named metal, ITO and an organic conductive material as a material of the electrode. When an electric field is applied to an element, a strong electric filed can be effectively applied to an organic thin film, if an insulator layer is disposed on the electrode, as shown in FIG. 17. That is, generally, when an electric field becomes stronger, an unfavorable influence is exercised on a structure of an organic thin film, since a current which flows in the organic film is increased by a great margin. Therefore, an electric field stronger than an intensity cannot be actually applied. On the other hand, if an insulator layer is positioned between the electrode and the organic thin film, a current which flows in the organic thin film is not increased even under application of a strong field and a strong electric field can be applied to the organic thin film. As a material of such an insulator layer, oxide such as $SiO_2$, $SrTiO_3$ or the like, or ferroelectric, organic high polymer or the like are named. Especially, in order to apply an electric field with an organic thin film, it is preferable to use an insulating material having a dielectric constant of 10 or more, for example ferroelectric such as $SrTiO_3$.

In the present invention, an organic thin film can be constructed as a mixed-stack charge transfer complex, in which donor molecules and acceptor molecules are alternately stacked while molecular planes of an adjoining pair of a donor molecule and an acceptor molecule face each other in an opposed manner. Examples of such a mixed-stack charge transfer complex are shown below: phenothiazine-TCNQ, tetradiaminopyrene-TCNQ, TTF-chloranil, TTF-fuluoranil, dibenzeneTTF-TCNQ, diethyldimethytetraselenafulvalene-diethylTCNQ, tetradiaminopyrene-fuloranil, TTF-dichlorodicyanobenzoquinone, perylene-tetracyanoethylene, perylene-TCNQ, TTF-dinitrobenzene, perylene-chloranil, pyrene-tetracyanoethylene, pyrene-chloranil, anthracene-chloranil, hexamethylbenzene-chloranil, naphthalene-tetracyanoethylene, anthracene-pyromelliticaciddianhydride, anthracene-tetracyanobenzene, phenanthrene-pyromelliticaciddianhydride and other complexes.

In such a manner, if a thickness of an organic thin film comprising donor molecules and acceptor molecules is too larger, an effective electric field applied to the film tends to be reduced under influence of an electric field created by carrier produced therein. However, a thickness of a film is equal to or less than its debye length (about 30 nm), an electric field produced by carriers can be screened. In the case where a complex is ionic and a thickness is decreased, an item of a Mahdelung energy of complex stabilization energies is reduced in its contribution and the complex is shifted to a neutral state. Therefore, a charge transfer state of the complex can be set in a neutral condition in the vicinity of a boundary condition for transition. Accordingly, the neutral to ionic transition can be efficiently realized in a lower electric field.

An operational principle of an organic thin film element of the present invention will be described in examples of the element in a more concrete manner:

(a) Display element

A display element has a structure constructed by successively forming the following layers on a transparent substrate 151 in the order, as shown in FIG. 17: a transparent electrode 155, an insulating layer 156, an orientation control layer 152, an organic thin film 153, an insulating layer 157 and a back electrode 158. In this display element, when an electric field is applied to the organic then film with an electrode, a mixed-charge transfer complex making an organic thin film is transited from neutrality to ionicity and an absorption wavelength of light is changed, so that a display function can be obtained. In the present invention, a degree of molecular orientation of organic molecules can be improved and a luminous efficiency is increased in the presence of an orientation control layer.

(b) Field effect transistor (FET)

A field effect transistor has a fundamental structure that a gate insulating film, an orientation control layer, an organic thin film, and a gate electrode are successively formed, in that order, on a channel region between source/drain regions fabricated on the surface of a semiconductor substrate. In this FET, as a gate voltage is gradually increased, a mixed-stack charge transfer complex, of which an organic thin film is made, is shifted form neutrality to ionicity to increase a drain current abruptly, that is, a switching function is shown.

In the present invention, with incorporation of an orientation control layer, a degree of molecular orientation of organic molecules constructing an organic thin film formed on the orientation control layer is improved and a larger output power can be obtained.

Moreover, in any element, if the structure shown in FIG. 16 is adopted and a superlattice structure is formed by stacking a plurality of organic thin films, a multivalued display function or a switching function can be realized.

Organic thin film elements of the present invention will be described on structure, fabrication, molecular orientation and the like in detail in examples and comparative examples below:

Example 2-1

A molecular orientation control layer 152 having an amorphous structure made of OXD-S4 molecules and a film thickness of about 50 nm was formed on a Si substrate 151 by means of a vacuum evaporation method. Thereafter, an organic thin film 153 with a thickness of 200 Å made of anthracene molecules was formed in conditions that a temperature of anthracene crystal powder is 10° C., a pressure is about $1\times10^{-9}$ Torr and a growth speed is 10 Å/min to obtain an organic thin film element with a structure as shown in FIG. 15.

A degree of molecular orientation of the anthracene thin film was in situ evaluated by means of a infrared spectrophotometry and, as a result, it was observed that planar molecular planes of anthracene molecules were oriented in parallel with the surface to form a thin film.

Comparative example 2-1

A molecular orientation control layer 152 with a thickness of about 50 nm having a amorphous structure made of OXD-S4 molecules was formed on an Si substrate 151. Then, an organic thin film 153 with a thickness of 100 Å made of made of anthracene molecules was formed under conditions that anthracene crystal powder is heated at 50° C., a pressure is about $1\times10^{-7}$ Torr and a growth speed is 1000 Å/min to obtain an organic thin film element with a structure as shown in FIG. 15.

A degree of molecular orientation of the anthracene thin film was in situ evaluated by means of a infrared spectrophotometry and, as a result, it was observed that anthracene molecules were disposed in a plurality of crystallographic orientations in the thin film and it was concluded that control in crystal structure had not been performed. Moreover, from an observation on a surface structure with a scanning electron microscope, it was found that the anthracene thin film had a polycrystalline particle structure.

Example 2-2

A molecular orientation control layer 152 having an amorphous structure made of OXD-S4 molecules and a film thickness of about 50 nm was formed on a Si substrate 151 by means of a vacuum evaporation method. Thereafter, an organic thin film 153 with a thickness of 100 Å made of TCNQ molecules was formed in conditions that a temperature of TCNQ crystal powder is 60° C., a pressure is about $1\times10^{-9}$ Torr and a growth speed is 10 Å/min to obtain an organic thin film element with a structure as shown in FIG. 15.

A degree of molecular orientation of the TCNQ thin film was in situ evaluated by means of a infrared spectrophotometry and, as a result, it was observed that planar planes of TCNQ molecules were oriented in parallel with the surface to form a thin film.

Example 2-3

A molecular orientation control layer 152 having an amorphous structure made of OXD-S4 molecules and a film thickness of about 50 nm was formed on an Si substrate 151 by means of a vacuum evaporation method. Thereafter, an organic thin film 153 with a thickness of about 100 Å made of charge transfer complex TTF-chloranil molecules was formed in conditions that a temperature of TTF-chloranil crystal powder is 50° C., a pressure is about $1\times10^{-9}$ Torr and a growth speed is 20 Å/min to obtain an organic thin film element with a structure as shown in FIG. 15.

A degree of molecular orientation of the complex thin film was in situ evaluated by means of a infrared spectrophotometry and, as a result, it was observed that planar planes of TTF and chloranil molecules were both oriented in parallel with the surface to form a crystalline complex thin film.

Example 2-4

A molecular orientation control layer 152 having an amorphous structure made of OXD-S8 molecules and a film thickness of about 50 nm was formed on a glass substrate 151 by means of a vacuum evaporation method. Thereafter, an organic thin film 153 with a thickness of 100 Å made of TCNQ molecules was formed in conditions that a temperature of TCNQ crystal powder is 60° C., a pressure is about $1\times10^{-9}$ Torr and a growth speed is 10 Å/min.

A degree of molecular orientation of the TCNQ thin film was in situ evaluated by means of a infrared spectrophotometry and, as a result, it was observed that planar planes of TCNQ were oriented in parallel with the surface to form a thin film.

Example 2-5

A molecular orientation control layer 152 having an amorphous structure made of TCTA molecules and a film thickness of about 50 nm was formed on an Si substrate 151 by means of a vacuum evaporation method. Thereafter, an organic thin film 153 with a thickness of about 100 Å made of TTF-chloranil molecules was formed in conditions that a temperature of TTF-chloranil crystal powder is 50° C., a pressure is about $1\times10^{-9}$ Torr and a growth speed is 20 Å/min.

A degree of molecular orientation of the complex thin film was in situ evaluated by means of a infrared spectrophotometry and, as a result, it was observed that planar planes of TTF and chloranil molecules were both oriented in parallel with the surface to form a thin film.

Example 2-6

A molecular orientation control layer 152 having an amorphous structure made of polystyrene molecules and a film thickness of about 50 nm was formed on an Si substrate 151 by means of a vacuum evaporation method. Thereafter, an organic thin film 153 with a thickness of 100 Å made of TCNQ molecules was formed in conditions that a temperature of TCNQ crystal powder is 60° C., a pressure is about $1\times10^{-9}$ Torr and a growth speed is 10 Å/min.

A degree of molecular orientation of the TCNQ thin film was in situ evaluated by means of a infrared spectrophotometry and, as a result, it was observed that planar planes of TCNQ molecules were oriented in parallel with the surface to form a thin film.

Example 2-7

A molecular orientation control layer 152 having an amorphous structure made of polymethylphenylsilane molecules and a film thickness of about 50 nm was formed on an Si substrate 151 by means of a vacuum evaporation method. Thereafter, an organic thin film 153 with a thickness of 100 Å made of TCNQ molecules was formed in conditions that a temperature of TCNQ crystal powder is 60° C., a pressure is about $1 \times 10^{-9}$ Torr and a growth speed is 100 Å/min to obtain an organic thin film as shown in FIG. 15.

A degree of molecular orientation of the TCNQ thin film was in situ evaluated by means of a infrared spectro-photometry and, as a result, it was observed that planar planes of TCNQ molecules were oriented in parallel with the surface to form a thin film.

Example 2-8

A molecular orientation control layer 152 made of amphiphilic polysilane with a phenol substitutional group molecules (methyl(m-hydroxyphenyl)polysilane: polysilane main chains are oriented in parallel to the surface of a substrate) was formed on an Si substrate 151 by means of a LB method. Thereafter, an organic thin film 153 with a thickness of 100 Å made of TCNQ molecules was formed in conditions that a temperature of TCNQ crystal powder is 60( a pressure is about $1 \times 10^{-9}$ Torr and a growth speed is 10 Å/min to obtain an organic thin film as shown in FIG. 15.

A degree of molecular orientation of the TCNQ thin film was in situ evaluated by means of a infrared spectro-photometry and, as a result, it was observed that planar planes of TCNQ molecules were oriented in parallel with the surface to form a thin film.

Example 2-9

A molecular orientation control layer 152 having an amorphous structure made of polypyrrole with $ClO_4^-$ as a dopant ion and a thickness of about 50 nm was formed on an ITO substrate 151 by means of an electrolytic polymerization method. Thereafter, an organic thin film 153 with a thickness of 100 Å made of TCNQ molecules was formed in conditions that a temperature of TCNQ crystal powder is 60° C., a pressure is about $1 \times 10^{-9}$ Torr and a growth speed is 10 Å/min.

A degree of molecular orientation of the TCNQ thin film was in situ evaluated by means of a infrared spectro-photometry and, as a result, it was observed that planar planes of TCNQ molecules were oriented in parallel with the surface to form a thin film.

Example 2-10

A molecular orientation control layer 152 having an amorphous structure made of OXD-S8 molecules and a film thickness of about 50 nm was formed on a glass substrate by means of a vacuum evaporation method. Thereafter, an organic thin film 153 with a thickness of 100 Å made of TCNQ molecules with a thickness of 100 Å was formed in conditions that a temperature of TCNQ crystal powder is 60° C., a pressure is about $1 \times 10^{-9}$ Torr and a growth speed is 10 Å/min.

Moreover, a second molecular orientation control layer 152 having an amorphous structure made of OXD-S8 molecules and a thickness of about 50 nm was formed on the organic film 153 by means of the vacuum evaporation method. Thereafter, a second organic thin film 154 with a thickness of 50 Å made of perylene molecules was formed in conditions that a temperature of perylene crystal powder is 100° C., a pressure is about $1 \times 10^{-9}$ Torr and a growth speed is 5 Å/min to obtain an organic thin film element with a structure as shown in FIG. 16.

A degree of molecular orientation of each of the TCNQ thin film and the perylene thin film was in situ evaluated by means of a infrared spectro-photometry and, as a result, it was observed that planar planes of TCNQ and perylene molecules were both oriented in parallel with the surface to form respective thin films.

Example 2-11

An ITO transparent electrode 155 with a film thickness of 400 Å and an insulating layer 156 with a film thickness of 150 nm made of $SrTiO_3$ was formed on a quartz substrate 151. A molecular orientation control layer 152 with a thickness of about 50 nm and having an amorphous structure made of TCTA molecules was subsequently by means of a vacuum evaporation method. Thereafter, an organic thin film 153 with a thickness of about 100 Å made of charge transfer complex TTF-chloranil molecules was formed in conditions that a temperature of TTF-chloranil crystal powder is 50° C., a pressure is about $1 \times 10^{-9}$ Torr and a growth speed is 20 Å/min.

A degree of molecular orientation of the TTF-chloranil thin film was in situ evaluated by means of a infrared spectro-photometry and, as a result, it was observed that planar planes of TTF and chloranil molecules were oriented in parallel with the surface to form a thin film.

Besides, an insulating layer 157 with a thickness of 20 nm made of polyisobutylmethacrylate and an Au semi-transparent electrode 158 were in succession formed to obtain an organic thin film element with a display function as shown in FIG. 17.

This display element shows light yellow under no application of a voltage, but, when a voltage is applied, color was changed to red.

Example 2-12

In a similar manner to that of the example 2-1, a molecular orientation control layer 152 having an amorphous structure made of OXD-S4 molecules and a film thickness of about 50 nm was formed on a quartz substrate 1 by means of a vacuum evaporation method. Thereafter, an organic thin film 153 with a thickness 10 Å made of anthracene molecules was formed at a growth speed is 152 Å/min to obtain an organic thin film element with a structure shown in FIG. 15.

A degree of molecular orientation of the anthracene thin film was in situ evaluated by means of a infrared spectro-photometry and, as a result, it was observed that planar molecular planes of anthracene molecules were oriented in parallel with the surface to form a thin film.

Moreover, crystallinity of the anthracene thin film was then in situ evaluated by means of a low energy electron diffraction method and it was found that two dimensional lattice was regularly arranged. The thin film was cooled down to a liquid He temperature and a nonlinear susceptibility of third order $\chi^{(3)}$ was evaluated by a non-linear spectro-photometry to obtain a value as large as $10^{-5}$ esu. With this value, the thin film was investigated on optical bistabilty while two laser light beams, one for control light and the other for signal light, were radiated to the thin film and it was found that a hysteresis was recognized in an input vs output curve obtained and an on/off switching time was measured to be on the order of 1 pico-second.

Example 2-13

Figure 18:
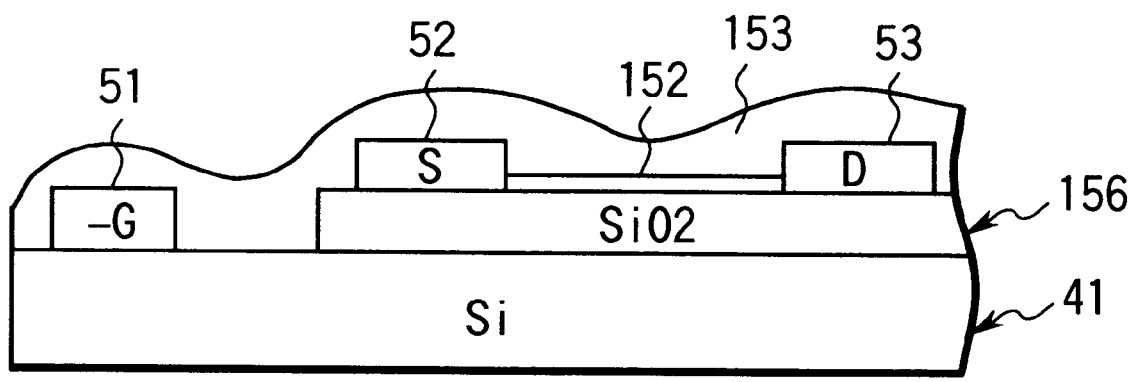
FIG. 18 is a schematic sectional view of a further example of a structure of an organic thin film element of the present invention.

In FIG. 18, a sectional view of an example of a structure of an n-channel field effect transistor (FET) of the present invention is shown in a schematic manner.

An $SiO_2$ insulating film was formed on a channel region between source/drain regions on an Si substrate and source/drain electrodes 52 and 53 were then formed on the $SiO_2$ insulating film. A gate electrode 51 was then formed on the Si substrate. Thus a substrate 41 for the following process was prepared. A molecular orientation control layer 152 with a thickness of about 50 nm and having an amorphous structure made of OXD-D4 molecules was formed on the $SiO_2$ insulating layer by a vacuum evaporation method. Subsequently, an organic thin film 153 with a thickness of 200 Å made of $C_{60}$ was formed in conditions that $C_{60}$ was heated at 300° C., a pressure is about $1 \times 10^{-9}$ Torr and a growth speed is 20 Å/min to obtain an n-channel field effect transistor (FET) as shown in FIG. 18.

A field effect mobility of this FET was evaluated and a value of 0.15 $cm^2$/V·sec was obtained.

Example 2-14

Figure 19:
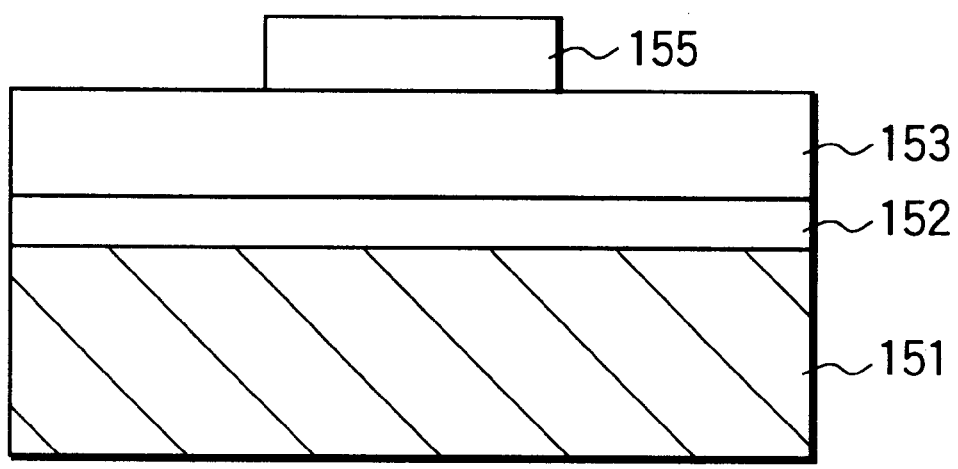
FIG. 19 is a schematic sectional view of a still further example of a structure of an organic thin film element of the present invention.

In FIG. 19, an example of a structure of a photodiode of the present invention is shown.

A molecular orientation control layer 152 having an amorphous structure made of OXD-S4 molecules and with a thickness of about 50 nm was formed on an ITO substrate 151 by means of a vacuum evaporation method. Thereafter, an organic thin film 153 with a thickness of 200 Å made of copper phthalocyanine molecules was formed in conditions that the phthalocyanine powder was heated at 330° C., a pressure is about $1 \times 10^{-9}$ Torr and a growth speed is 50 Å/min.

A degree of molecular orientation of the thin film was in situ evaluated by means of a infrared spectro-photometry and, as a result, it was observed that planar molecular planes of TCNQ molecules were oriented in parallel with the surface to form a thin film.

A photodiode as shown in FIG. 19 was formed by formation of an upper electrode on the thin film. When light of 500 nm was illuminated to the element, an photocurrent was measured at an external quantum efficiency of 30%.

As is clear from the examples 2-1 to 2-14, an organic thin film element of the present invention has a dramatically improved orientation controllability on organic molecules in an organic thin film. For example, an element in which the neutral-ionic transition in a charge transfer complex organic thin film is controlled with application of a voltage can be formed on a glass/ITO substrate suitable for a display element and besides a phase transition can be efficiently brought about. In such a manner, an organic thin film can be formed on any kind of substrate, while effecting the most suitable molecular or crystalline orientation in a controlling manner and therefore, with the help of such an organic thin film, practical use of an electronic element, a display element, an optical information recording medium and a non-linear optical element can be expected. Accordingly, an organic thin film element of the present invention should be highly evaluated in an industrial sense.

Next, examples, in each of which an amorphous organic thin film made of molecules having a steroid based skelton is used, are shown.

Example 2-15

An organic thin film element was obtained in a similar manner to that of the example 2-2 with exception that a molecular orientation control layer having an amorphous structure made of cholic acid was formed instead of the molecular orientation control layer having an amorphous structure made of OXD-S4 molecules. Better results were attained from evaluation of the organic thin film element.

Example 2-16

An organic thin film element was obtained in a similar manner to that of the example 2-3 with exception that a molecular orientation control layer having an amorphous structure made of cholic acid was formed instead of the molecular orientation control layer having an amorphous structure made of OXD-S4 molecules. Better results were attained from evaluation of the organic thin film element.

Example 2-17

An organic thin film element was obtained in a similar manner to that of the example 2-3 with exception that a molecular orientation control layer having an amorphous structure made of methyl cholate was formed instead of the molecular orientation control layer having an amorphous structure made of OXD-S8 molecules. Better results were attained from evaluation of the organic thin film element.

Example 2-18

An organic thin film element was obtained in a similar manner to that of the example 2-9 with exception that a molecular orientation control layer having an amorphous structure made of cholic acid was formed instead of the molecular orientation control layer with a thickness of about 50 nm and having an amorphous structure made of polyrrole with $CiO^{4-}$ as dopant ion by means of an electrolytic polymerization method. Better results were attained from evaluation of the organic thin film element.

Example 2-19

An organic thin film element was obtained in a similar manner to that of the example 2-10 with exception that a molecular orientation control layer having an amorphous structure made of cholic acid was formed instead of the molecular orientation control layer having an amorphous structure made of OXD-S8 molecules. Better results were attained from evaluation of the organic thin film element.

Example 2-20

An organic thin film element with a display function was obtained in a similar manner to that of the example 2-11 with exception that a molecular orientation control layer having an amorphous structure made of cholic acid was formed instead of the molecular orientation control layer having an amorphous structure made of TCTA molecules, and, moreover, a layer with a thickness of 50 nm made of cholic acid and an insulating layer with a thickness of 20 nm made of polyisobutylmethacrylate were formed instead of the insulating layer with a thickness of 20 nm made of polyisobutylmethacrylate. Better results were attained from evaluation of the organic thin film element.

Example 2-21

An organic thin film element was obtained in a similar manner to that of the example 2-12 with exception that a molecular orientation control layer having an amorphous structure made of cholic acid was formed instead of the molecular orientation control layer having an amorphous structure made of OXD-S4 molecules. Better results were attained from evaluation of the organic thin film element.

Example 2-22

An n-channel field effect transistor was obtained in a similar manner to that of the example 2-13 with exception that a molecular orientation control layer having an amorphous structure made of cholic acid was formed instead of the molecular orientation control layer having an amorphous structure made of OXD-S4 molecules. Better results were attained from evaluation of the organic thin film element.

Example 2-23

A photodiode was obtained in a similar manner to that of the example 2-14 with exception that a molecular orientation control layer having an amorphous structure made of cholic acid was formed instead of the molecular orientation control layer having an amorphous structure made of OXD-S4 molecules. Better results were attained from evaluation of the organic thin film element.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. A light control element comprising:

a substrate;

a first electrode layer formed on the substrate;

a first insulator layer formed on the first electrode layer;

a light control layer containing an electron donating organic compound and an electron accepting organic compound formed on the first insulator layer;

a second insulator layer formed on the light control layer;

a second electrode layer formed on the second insulator layer; and an external field source configured to apply an external electric field with an intensity less than a necessary value to cause charge transfer exciton generation in the light control layer, wherein charge-transfer excitons are generated in the light control layer by application of the external electric field with an intensity less than said necessary value; and a light source to radiate light to said light control layer. wherein the radiated light controls phase transition in said light control layer.

2. A light control element according to claim 1, wherein the light source includes a signal light source positioned to radiate signal light to said light control layer and a control light source which controls the phase transition in said light control layer and thereby an output intensity of the signal light.

3. A light control element according to claim 1, wherein said light control layer consists essentially of a mixed-stack charge transfer complex crystal, in which electron donating organic compounds and electron accepting organic compounds are alternately stacked, and neutral to ionic transition occurs under application of a predetermined electric field.

4. A light control element according to claim 1, wherein at least one of the first and second insulator layers has optical tranasmissivity.

5. A light control element according to claim 1, wherein the light control element further comprises means for guiding the signal light to the light control layer in a direction in parallel to one major surface of said substrate.

6. A light control element according to claim 1, wherein said light control element further comprises an orientation control layer in at least one of a position between said first insulator layer and said light control layer, and a position between said second insulator layer and said light control layer.

7. A light control element according to claim 6, wherein said orientation control layer consists essentially of an amorphous organic film.

8. A light control element according to claim 7, wherein said orientation control layer consisting essentially of said amorphous organic film comprises molecules having a steroid based skelton.

9. A light control element according to claim 8, wherein said orientation control layer consisting essentially of an amorphous organic film has a structure in which different amorphous organic films are stacked and at least includes an amorphous organic film having molecules having a steroid based skelton in the structure.

* * * * *